(12) United States Patent
Lai et al.

(10) Patent No.: US 12,040,720 B2
(45) Date of Patent: Jul. 16, 2024

(54) RESONANCE CONVERSION DEVICE AND UNIVERSAL SERIAL BUS CIRCUIT

(71) Applicants: Chicony Power Technology Co., Ltd., New Taipei (TW); National Taipei University of Technology, Taipei (TW)

(72) Inventors: Yen-Shin Lai, Taipei (TW); Yong-Yi Huang, Taipei (TW); Xiang-Yu Wu, Taipei (TW); You-Quan Dong, Taipei (TW); Shu-Hao Wu, New Taipei (TW)

(73) Assignees: Chicony Power Technology Co., Ltd., New Taipei (TW); National Taipei University of Technology, Taipei (TW)

( * ) Notice: Subject to any disclaimer, the term of this patent is extended or adjusted under 35 U.S.C. 154(b) by 361 days.

(21) Appl. No.: 17/704,442

(22) Filed: Mar. 25, 2022

(65) Prior Publication Data
US 2023/0238890 A1    Jul. 27, 2023

(30) Foreign Application Priority Data
Jan. 24, 2022 (TW) ................................. 111103015

(51) Int. Cl.
*H02M 3/335* (2006.01)
*H02M 1/00* (2006.01)
(Continued)

(52) U.S. Cl.
CPC ..... *H02M 3/33573* (2021.05); *H02M 1/0035* (2021.05); *H02M 1/08* (2013.01); *H02M 3/01* (2021.05); *H02M 3/33576* (2013.01)

(58) Field of Classification Search
CPC ........ H02M 1/08; H02M 1/0035; H02M 3/08; H02M 3/33573
See application file for complete search history.

(56) References Cited

U.S. PATENT DOCUMENTS

| 6,804,129 B2 | 10/2004 | Lin |
| 9,263,960 B2 | 2/2016 | Jovanovic et al. |

(Continued)

FOREIGN PATENT DOCUMENTS

| CN | 104467443 | 3/2015 |
| CN | 108258910 | 7/2018 |

(Continued)

*Primary Examiner* — Jue Zhang
*Assistant Examiner* — Lakaisha Jackson
(74) *Attorney, Agent, or Firm* — Andrew M. Calderon; Calderon Safran & Wright, PC

(57) ABSTRACT

A resonance conversion device and a universal serial bus circuit are provided. The resonance conversion device includes an input filter circuit, a full-bridge LLC converter circuit, a transformer circuit, a rectifier filter circuit, and a controller. The controller is configured to determine whether an indication voltage of a voltage command is less than or equal to a threshold value and to perform the following steps: in response to the indication voltage being less than or equal to the threshold value, controlling the full-bridge LLC converter circuit into a half-bridge operation mode, and regulating the DC output voltage by performing half-bridge burst mode control on the full-bridge LLC converter circuit based on the DC output voltage; and in response to the indication voltage being greater than the threshold value, regulating the DC output voltage by performing full-bridge burst mode control on the full-bridge LLC converter circuit based on the DC output voltage.

44 Claims, 15 Drawing Sheets

(51) Int. Cl.
*H02M 1/08* (2006.01)
*H02M 3/00* (2006.01)

(56) References Cited

U.S. PATENT DOCUMENTS

| | | |
|---|---|---|
| 10,389,233 B1 | 8/2019 | Lim |
| 2006/0133119 A1 | 6/2006 | Nomura et al. |
| 2015/0049515 A1* | 2/2015 | Zhao ................ H02M 3/33507 363/17 |
| 2015/0098254 A1 | 4/2015 | Brinlee et al. |
| 2015/0162840 A1 | 6/2015 | Frost et al. |
| 2015/0229225 A1 | 8/2015 | Jang et al. |
| 2019/0068069 A1* | 2/2019 | Sheng ..................... H02M 3/01 |
| 2023/0077388 A1* | 3/2023 | Rehlaender ............. H02M 3/01 363/17 |
| 2023/0198371 A1* | 6/2023 | Tian .................... H02J 7/00711 363/17 |

FOREIGN PATENT DOCUMENTS

| | | |
|---|---|---|
| CN | 108964466 | 12/2018 |
| CN | 110504847 | 11/2019 |
| TW | 201027892 | 7/2010 |
| TW | 670919 | 9/2019 |
| TW | 201937329 | 9/2019 |
| TW | 750780 | 12/2021 |

\* cited by examiner

RESONANCE CONVERSION DEVICE AND UNIVERSAL SERIAL BUS CIRCUIT

CROSS-REFERENCE TO RELATED APPLICATION

This non-provisional application claims priority under 35 U.S.C. § 119(a) to Patent Application No. 111103015 filed in Taiwan, R.O.C. on Jan. 24, 2022, the entire contents of which are hereby incorporated by reference.

BACKGROUND

Technical Field

The present invention relates to a resonance conversion device, and in particular, to a full-bridge LLC resonance conversion device with a hybrid control mechanism.

Related Art

In order to meet requirements of a small volume and high power density, switch power supplies gradually replace conventional linear power supplies. However, because the voltage and the current are not zero when a power control switch of a switch power supply is turned on or turned off, the voltage and the current have a high overlapping region area, that is, a high switching loss during switching, and thereby heat is generated, causing efficiency reduction. In addition, as the switching frequency increases, the switching loss and electromagnetic interference also increase. LLC resonance conversion devices have attracted more attention in recent years due to their advantages of zero-voltage switching and a voltage regulation capability. In order to adapt to complex application scenarios, achieve a wide output voltage, and improve the efficiency, a novel full-bridge LLC resonance conversion device with a hybrid control mechanism is urgently needed in this field.

SUMMARY

In view of the above, embodiments of the present invention provide a resonance conversion device and a universal serial bus circuit to improve the existing technical problems.

An embodiment of the present invention provides a resonance conversion device. The resonance conversion device includes an input filter circuit, a full-bridge LLC converter circuit, a transformer circuit, a rectifier filter circuit, and a controller. The input filter circuit is configured to receive a DC input voltage and filter the DC input voltage to output a filtered DC voltage. The full-bridge LLC converter circuit is configured to receive the filtered DC voltage and output a converted voltage. The transformer circuit includes a primary side and a secondary side. The primary side of the transformer circuit is coupled to the full-bridge LLC converter circuit to receive the converted voltage. The secondary side of the transformer circuit induces the converted voltage to generate an induced voltage. The rectifier filter circuit is coupled to the secondary side of the transformer circuit, and is configured to receive, rectify, and filter the induced voltage to output a DC output voltage. The controller is coupled to the full-bridge LLC converter circuit and the rectifier filter circuit. The controller can detect the DC output voltage and receive a voltage command from outside. The controller is configured to determine whether an indication voltage of the voltage command is less than or equal to a threshold value and to perform the following steps: in response to the indication voltage being less than or equal to the threshold value, controlling the full-bridge LLC converter circuit into a half-bridge operation mode, and regulating the DC output voltage by performing half-bridge burst mode control on the full-bridge LLC converter circuit based on the DC output voltage; and in response to the indication voltage being greater than the threshold value, regulating the DC output voltage by performing full-bridge burst mode control on the full-bridge LLC converter circuit based on the DC output voltage.

Another embodiment of the present invention provides a resonance conversion device. The resonance conversion device includes an input filter circuit, a full-bridge LLC converter circuit, a transformer circuit, a rectifier filter circuit, a load detection circuit, and a controller. The input filter circuit is configured to receive a DC input voltage and filter the DC input voltage to output a filtered DC voltage. The full-bridge LLC converter circuit is configured to receive the filtered DC voltage and output a converted voltage. The transformer circuit includes a primary side and a secondary side. The primary side of the transformer circuit is coupled to the full-bridge LLC converter circuit to receive the converted voltage. The secondary side of the transformer circuit induces the converted voltage to generate an induced voltage. The load detection circuit detects a load condition of the resonance conversion device. The rectifier filter circuit is coupled to the secondary side of the transformer circuit, and is configured to receive, rectify, and filter the induced voltage to output a DC output voltage. The controller is coupled to the full-bridge LLC converter circuit, the load detection circuit, and the rectifier filter circuit. The controller can detect the DC output voltage, receive the load condition, and receive a voltage command from outside. The controller is configured to determine whether an indication voltage of the voltage command is less than or equal to a threshold value and to perform the following steps: in response to the indication voltage being less than or equal to the threshold value, controlling the full-bridge LLC converter circuit into a half-bridge operation mode, and regulating the DC output voltage by performing half-bridge burst-variable frequency switching mode control on the full-bridge LLC converter circuit based on the DC output voltage; and in response to the indication voltage being greater than the threshold value, regulating the DC output voltage by performing full-bridge burst-variable frequency switching mode control on the full-bridge LLC converter circuit based on the DC output voltage.

An embodiment of the present invention provides a universal serial bus (USB) circuit including the foregoing resonance conversion device. The USB circuit sends the voltage command to the resonance conversion device based on a request of an external device.

Based on the above, some embodiments of the present invention can avoid efficiency reduction by a single-level design. Some embodiments of the present invention can achieve a wide output voltage and improve the efficiency by switching the operation mode and control method of the full-bridge LLC converter circuit based on the indication voltage. Some embodiments of the present invention can further improve the efficiency by controlling using a variable frequency control method within a specific voltage and load range.

BRIEF DESCRIPTION OF THE DRAWINGS

FIG. 2-1 is a circuit structure diagram of the resonance conversion device according to an embodiment of the present invention;

FIG. 2-2 is a circuit structure diagram of the resonance conversion device according to an embodiment of the present invention;

FIG. 3-1 is a circuit structure diagram of the resonance conversion device according to an embodiment of the present invention;

FIG. 3-2 is a circuit structure diagram of the resonance conversion device according to an embodiment of the present invention;

DETAILED DESCRIPTION

Figure 1:
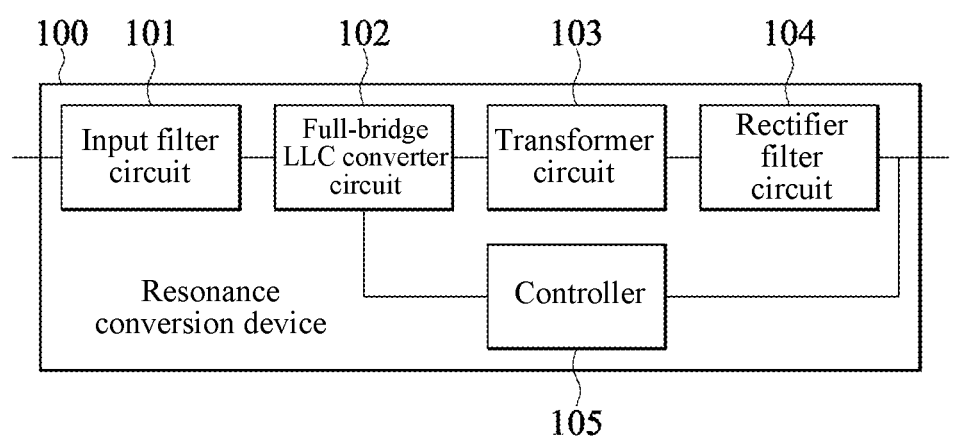
FIG. 1 is a block diagram of a resonance conversion device according to an embodiment of the present invention.

The foregoing and other technical content, features, and effects of the present invention can be clearly presented below in detailed description of embodiments with reference to the accompanying drawings. Thicknesses or sizes of components in the drawings expressed in an exaggerated, omitted or general manner are used to help a person skilled in the art to understand and read, and the size of each component is not completely its actual size and is not intended to limit restraint conditions under which the present invention can be implemented and therefore have no technical significance. Any modification to the structure, change to the proportional relationship or adjustment on the size should fall within the scope of the technical content disclosed by the present invention without affecting the effects and the objectives that can be achieved by the present invention. The same reference numbers in the drawings are used to represent the same or similar components. The term "couple" or "connect" mentioned in the following embodiments may refer to any direct or indirect connection means.

FIG. 1 is a block diagram of a resonance conversion device according to an embodiment of the present invention. Referring to FIG. 1, the resonance conversion device 100 includes an input filter circuit 101, a full-bridge LLC converter circuit 102, a transformer circuit 103, a rectifier filter circuit 104, and a controller 105. The input filter circuit 101 receives a DC input voltage and filters the DC input voltage to output a filtered DC voltage. The full-bridge LLC converter circuit 102 is a resonance switch converter, and includes a resonance tank formed by a resonance inductor, a resonance capacitor, and an excitation inductor. The full-bridge LLC converter circuit 102 receives the filtered DC voltage, and outputs a converted voltage through the resonance tank formed by the resonance inductor, the resonance capacitor, and the excitation inductor. The specific implementation of the full-bridge LLC converter circuit 102 will be described in detail in the following embodiments.

The transformer circuit 103 includes a primary side and a secondary side. The primary side of the transformer circuit 103 is coupled to the full-bridge LLC converter circuit to receive the converted voltage output by the resonance tank. The secondary side of the transformer circuit 103 induces the converted voltage to generate an induced voltage. The rectifier filter circuit 104 is coupled to the secondary side of the transformer circuit 103 to receive the induced voltage generated by the secondary side of the transformer circuit 103. In addition, the rectifier filter circuit 104 rectifies and filters the induced voltage to output a DC output voltage as an output of the resonance conversion device 100.

The controller 105 is coupled to the full-bridge LLC converter circuit 102 and an output end of the rectifier filter circuit 104. The controller 105 detects the DC output voltage output by the rectifier filter circuit 104 and receives a voltage command from outside. The voltage command includes an indication voltage used for indicating a value of the DC output voltage of the resonance conversion device 100. In some embodiments, the controller 105 further receives a load condition.

In some embodiments, the indication voltages include 5 V, 9 V, 15 V, 20 V, 28 V, 36 V, and 48 V. The indication voltage may satisfy the PD 3.1 specification (USB Power Delivery Specification Revision 3.1, Version 1.0) of the universal serial bus.

The controller 105 controls the full-bridge LLC converter circuit 102 based on the voltage command and the value of the detected DC output voltage output by the rectifier filter circuit 104.

Figure 9:
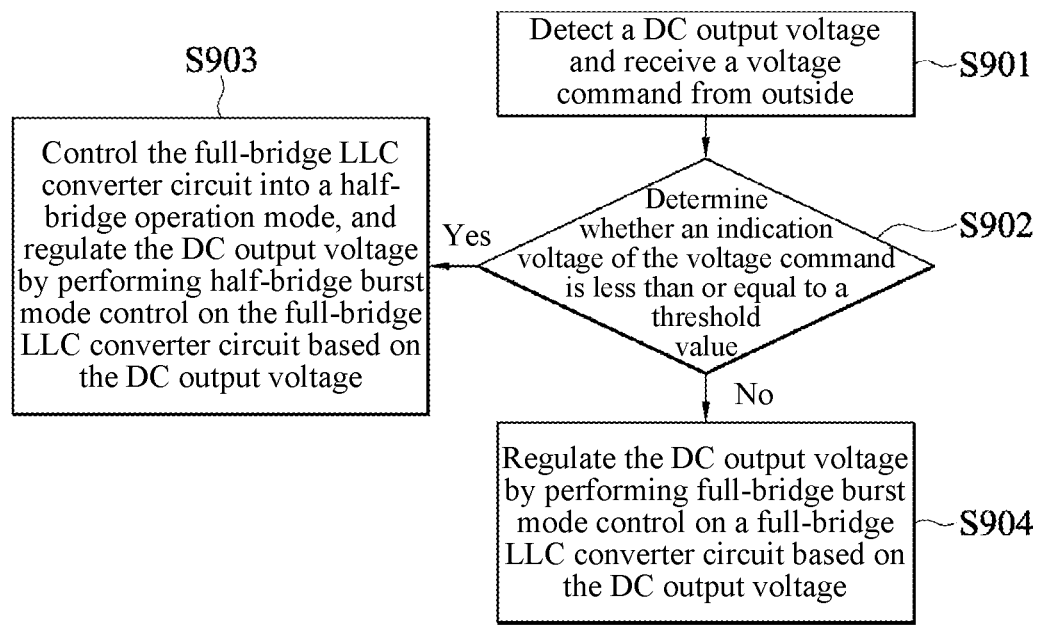
FIG. 9 is a control flow chart of the resonance conversion device according to an embodiment of the present invention.

FIG. 9 is a control flow chart of the resonance conversion device according to an embodiment of the present invention. In some embodiments of the present invention, based on the indication voltage of the voltage command received from outside and the value of the detected DC output voltage output by the rectifier filter circuit 104, the controller 105 sends a control signal to the full-bridge LLC converter circuit 102 to make the rectifier filter circuit 104 of the resonance conversion device 100 output a DC output voltage corresponding to the indication voltage. Refer to FIG. 1 and FIG. 9 together. Each step shown in FIG. 9 is performed by the controller 105. In step S901, the controller 105 detects the DC output voltage output by the rectifier filter circuit 104 and receives a voltage command from outside. In step S902, the controller 105 determines whether an indication voltage of the voltage command is less than or equal to a threshold value. When the indication voltage is less than or equal to the threshold value, the controller 105 controls the full-bridge LLC converter circuit 102 into a half-bridge operation mode, and regulates the DC output voltage by performing half-bridge burst mode control on the full-bridge LLC converter circuit 102 based on the value of the DC output voltage output by the rectifier filter circuit 104 and detected by the controller 105. When the indication voltage is greater than the threshold value, the controller 105 regulates the DC output voltage by performing full-bridge burst mode control on the full-bridge LLC converter circuit 102 based on the value of the DC output voltage output by the rectifier filter circuit 104 and detected by the controller 105.

Figure 12:
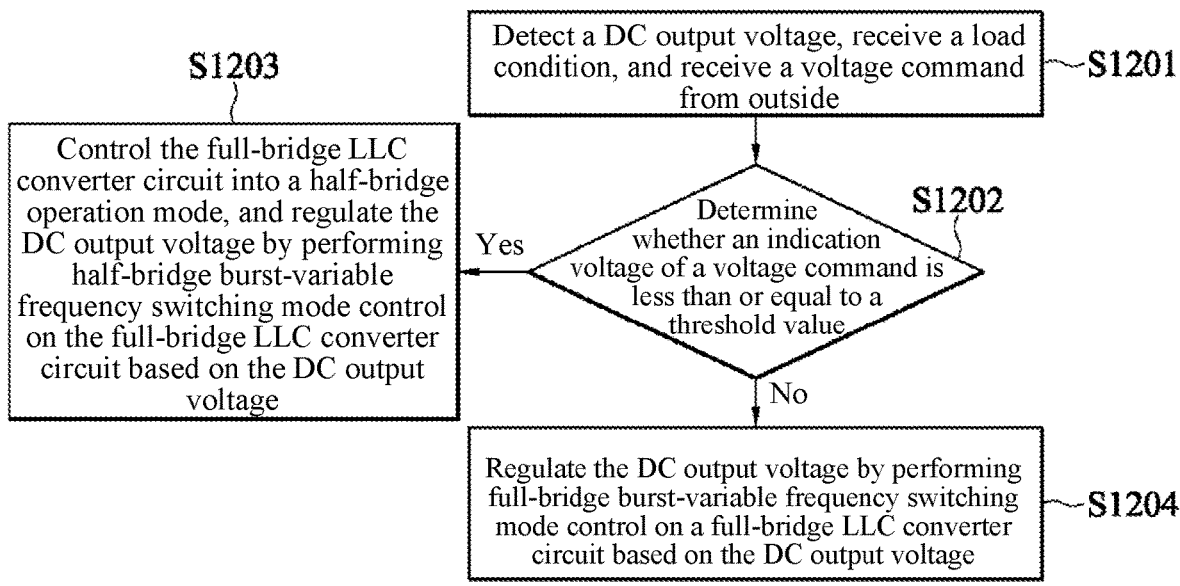
FIG. 12 is a control flow chart of the resonance conversion device according to an embodiment of the present invention.

FIG. 12 is a control flow chart of the resonance conversion device according to an embodiment of the present invention. Refer to FIG. 1 and FIG. 12 together. Each step shown in FIG. 12 is performed by the controller 105. In some embodiments of the present invention, based on the indication voltage of the voltage command received from outside, the load condition, and the value of the detected DC output voltage output by the rectifier filter circuit 104, the controller 105 sends a control signal to the full-bridge LLC converter circuit 102 to make the rectifier filter circuit 104 of the resonance conversion device 100 output a DC output voltage corresponding to the indication voltage.

In step S1201, the controller 105 detects the DC output voltage output by the rectifier filter circuit 104, receives a load condition, and receives a voltage command from outside. In step S1202, the controller 105 determines whether an indication voltage of the voltage command is less than or equal to a threshold value. When the indication voltage is less than or equal to the threshold value, the controller 105 controls the full-bridge LLC converter circuit 102 into a half-bridge operation mode, and regulates the DC output voltage by performing half-bridge burst-variable frequency switching mode control on the full-bridge LLC converter circuit 102 based on the value of the DC output voltage output by the rectifier filter circuit 104 and detected by the controller 105. When the indication voltage is greater than the threshold value, the controller 105 regulates the DC output voltage by performing full-bridge burst-variable frequency switching mode control on the full-bridge LLC converter circuit 102 based on the value of the DC output voltage output by the rectifier filter circuit 104 and detected by the controller 105.

Figures 1, 2:
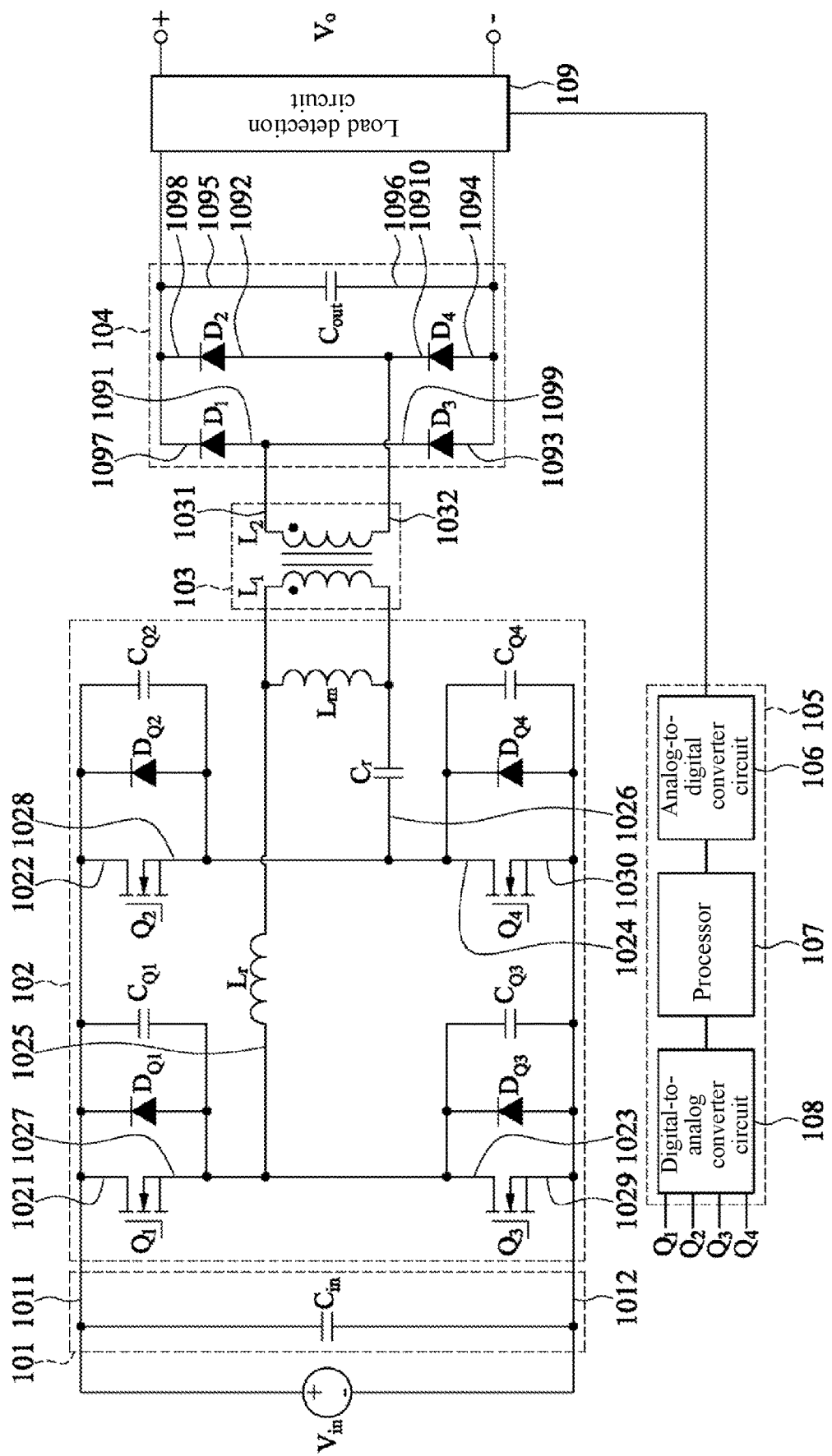
Figure 2:
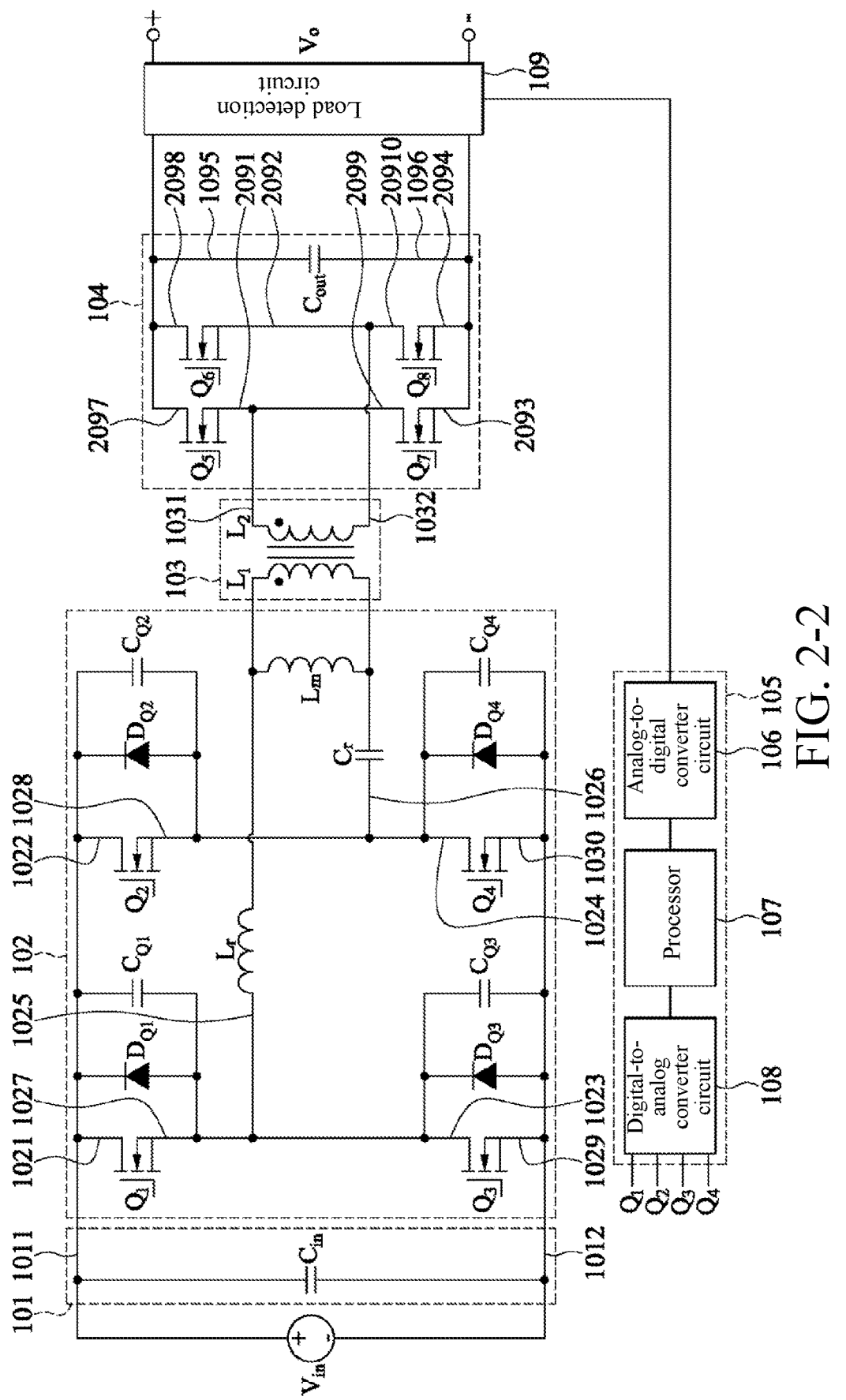

FIG. 2-1 is a circuit structure diagram of the resonance conversion device according to an embodiment of the present invention. Refer to FIG. 1 and FIG. 2-1 together. In some embodiments of the present invention, the resonance conversion device 100 receives a DC input voltage $V_{in}$ from outside. The input filter circuit 101 includes a filter capacitor $C_{in}$, and the filter capacitor $C_{in}$ is connected in parallel to the DC input voltage $V_{in}$ to filter the DC input voltage $V_{in}$, so as to output a filtered DC voltage. The full-bridge LLC converter circuit 102 includes a first switch $Q_1$, a second switch $Q_2$, a third switch $Q_3$, a fourth switch $Q_4$, and a series branch. The first switch $Q_1$, the second switch $Q_2$, the third switch $Q_3$, and the fourth switch $Q_4$ are n-type MOS field effect transistors.

A first end 1021 of the first switch $Q_1$ is coupled to a first end 1011 of the input filter circuit 101. The first switch $Q_1$ is connected in parallel to a diode $D_{Q1}$ and a capacitor $C_{Q1}$. A first end 1022 of the second switch $Q_2$ is coupled to the first end 1021 of the first switch $Q_1$ and the first end 1011 of the input filter circuit 101. The second switch $Q_2$ is connected in parallel to a diode $D_{Q2}$ and a capacitor $C_{Q2}$. A first end 1023 of the third switch $Q_3$ is coupled to a second end 1027 of the first switch $Q_1$, and a second end 1029 of the third switch $Q_3$ is coupled to a second end 1012 of the input filter circuit 101. The third switch $Q_3$ is connected in parallel to a diode $D_{Q3}$ and a capacitor $C_{Q3}$. A first end 1024 of the fourth switch $Q_4$ is coupled to a second end 1028 of the second switch $Q_2$, and a second end 1030 of the fourth switch $Q_4$ is coupled to the second end 1029 of the third switch $Q_3$. The fourth switch $Q_4$ is connected in parallel to a diode $D_{Q4}$ and a capacitor $C_{Q4}$.

The series branch includes a first resonance inductor $L_r$, a second resonance inductor $L_m$, and a resonance capacitor $C_r$ connected in series. The first resonance inductor $L_r$ is a resonance inductor of the full-bridge LLC converter circuit 102, the second resonance inductor $L_m$ is an excitation inductor of the full-bridge LLC converter circuit 102, and the resonance capacitor $C_r$ is a resonance capacitor of the full-bridge LLC converter circuit 102. The first resonance inductor $L_r$, the second resonance inductor $L_m$, and the resonance capacitor $C_r$ form a resonance tank of the full-bridge LLC converter circuit 102. A first end 1025 of the series branch is coupled between the second end 1027 of the first switch $Q_1$ and the first end 1023 of the third switch $Q_3$. A second end 1026 of the series branch is coupled between the second end 1028 of the second switch $Q_2$ and the first end 1024 of the fourth switch $Q_4$.

The primary side of the transformer circuit 103 includes a primary coil $L_1$. The secondary side of the transformer circuit 103 includes a secondary coil $L_2$. The ratio of the number of turns of the primary coil $L_1$ to the secondary coil $L_2$ is $N_1:N_2$. The second resonance inductor $L_m$ is connected in parallel to the primary coil $L_1$ of the primary side of the transformer circuit 103. The secondary coil $L_2$ includes a first end 1031 and a second end 1032, and the rectifier filter circuit 104 is coupled to the secondary side of the transformer circuit 103 through the first end 1031 and the second end 1032 of the secondary coil $L_2$.

The resonance conversion device 100 includes a load detection circuit 109. The load detection circuit 109 is coupled to an output end of the rectifier filter circuit 104 to detect a DC output voltage and a load current of the rectifier filter circuit 104. The load detection circuit 109 obtains the load condition by the DC output voltage and the load current of the rectifier filter circuit 104.

The rectifier filter circuit 104 includes a first forward conduction element $D_1$, a second forward conduction element $D_2$, a third forward conduction element $D_3$, a fourth forward conduction element $D_4$, and a capacitor $C_{out}$. The first forward conduction element $D_1$, the second forward conduction element $D_2$, the third forward conduction element $D_3$, and the fourth forward conduction element $D_4$ are all diodes. A first end 1091 of the first forward conduction element $D_1$ and a second end 1099 of the third forward conduction element $D_3$ are coupled. The first end 1031 of the secondary coil $L_2$ of the secondary side of the transformer circuit 103 is coupled between the first end 1091 of the first forward conduction element $D_1$ and the second end 1099 of the third forward conduction element $D_3$. A first end 1092 of the second forward conduction element $D_2$ and a second end 10910 of the fourth forward conduction element $D_4$ are coupled. The second end 1032 of the secondary coil $L_2$ of the secondary side of the transformer circuit 103 is coupled between the first end 1092 of the second forward conduction element $D_2$ and the second end 10910 of the fourth forward conduction element $D_4$. A second end 1097 of the first forward conduction element $D_1$, a second end 1098 of the second forward conduction element $D_2$, and a first end 1095 of the capacitor $C_{out}$ are coupled to each other. A first end 1093 of the third forward conduction element $D_3$, a first end 1094 of the fourth forward conduction element $D_4$, and a second end 1096 of the capacitor $C_{out}$ are coupled to each other. A voltage across the capacitor $C_{out}$ serves as the DC output voltage of the rectifier filter circuit 104. A DC output voltage $V_o$ of the resonance conversion device 100 is the DC output voltage of the rectifier filter circuit 104.

The controller 105 includes a processor 107, an analog-to-digital converter circuit 106, and a digital-to-analog converter circuit 108.

The analog-to-digital converter circuit 106 of the controller 105 receives the load condition of the load detection circuit 109, digitizes the load condition, and then transmits the digitized load condition to the processor 107. At the same time, the analog-to-digital converter circuit 106 also receives the DC output voltage output by the rectifier filter circuit 104, digitizes the DC output voltage output by the rectifier filter circuit 104, and then transmits the digitized DC output voltage to the processor 107.

The processor 107 receives a voltage command from outside, and the processor 107 obtains an indication voltage from the received voltage command. The indication voltage is used to indicate a value of the DC output voltage of the resonance conversion device 100.

It should be noted that, in the above embodiment, the controller 105 is implemented in a digital manner. Certainly, the controller 105 may alternatively be implemented in an analog manner. In this case, the controller 105 receives the DC output voltage, the load current, and the load condition of the rectifier filter circuit 104 that are detected by the load detection circuit 109, and outputs control signals of the first switch $Q_1$, the second switch $Q_2$, the third switch $Q_3$, and the fourth switch $Q_4$ after an analog calculation.

FIG. 2-2 is a circuit structure diagram of the resonance conversion device according to another embodiment of the present invention. Compared with the resonance conversion device shown in FIG. 2-1, the rectifier filter circuit 104 in the resonance conversion device 100 shown in FIG. 2-2 includes a fifth switch $Q_5$, a sixth switch $Q_6$, a seventh switch $Q_7$, an eighth switch $Q_8$, and a capacitor $C_{out}$. The fifth switch $Q_5$, the sixth switch $Q_6$, the seventh switch $Q_7$, and the eighth switch $Q_8$ are all n-type MOS field effect transistors. A second end 2091 of the fifth switch $Q_5$ is coupled to a first end 2099 of the seventh switch $Q_7$. The first end 1031 of the secondary coil $L_2$ of the secondary side of the transformer circuit 103 is coupled between the second end 2091 of the fifth switch $Q_5$ and the first end 2099 of the seventh switch $Q_7$. A second end 2092 of the sixth switch $Q_6$ is coupled to a first end 20910 of the eighth switch $Q_8$. The second end 1032 of the secondary coil $L_2$ of the secondary side of the transformer circuit 103 is coupled between the second end 2092 of the sixth switch $Q_6$ and the first end 20910 of the eighth switch $Q_8$. A first end 2097 of the fifth switch $Q_5$, a first end 2098 of the sixth switch $Q_6$, and a first end 1095 of the capacitor $C_{out}$ are coupled to each other. A second end 2093 of the seventh switch $Q_7$, a second end 2094 of the eighth switch $Q_8$, and a second end 1096 of the capacitor $C_{out}$ are coupled to each other. A voltage across the capacitor $C_{out}$ serves as the DC output voltage of the rectifier filter circuit 104. A DC output voltage $V_o$ of the resonance conversion device 100 is the DC output voltage of the rectifier filter circuit 104. The controller 105 sends appropriate control signals to the fifth switch $Q_5$, the sixth switch $Q_6$, the seventh switch $Q_7$, and the eighth switch $Q_8$, to rectify the induced voltage.

In some embodiments of the present invention, the controller 105 sends appropriate control signals to the fifth switch $Q_5$, the sixth switch $Q_6$, the seventh switch $Q_7$, and the eighth switch $Q_8$, so that the fifth switch $Q_5$, the sixth switch $Q_6$, the seventh switch $Q_7$, and the eighth switch $Q_8$ behave the same as those of the first forward conduction element $D_1$, the second forward conduction element $D_2$, the third forward conduction element $D_3$, and the fourth forward conduction element $D_4$ in FIG. 2-1.

Figures 1, 3:
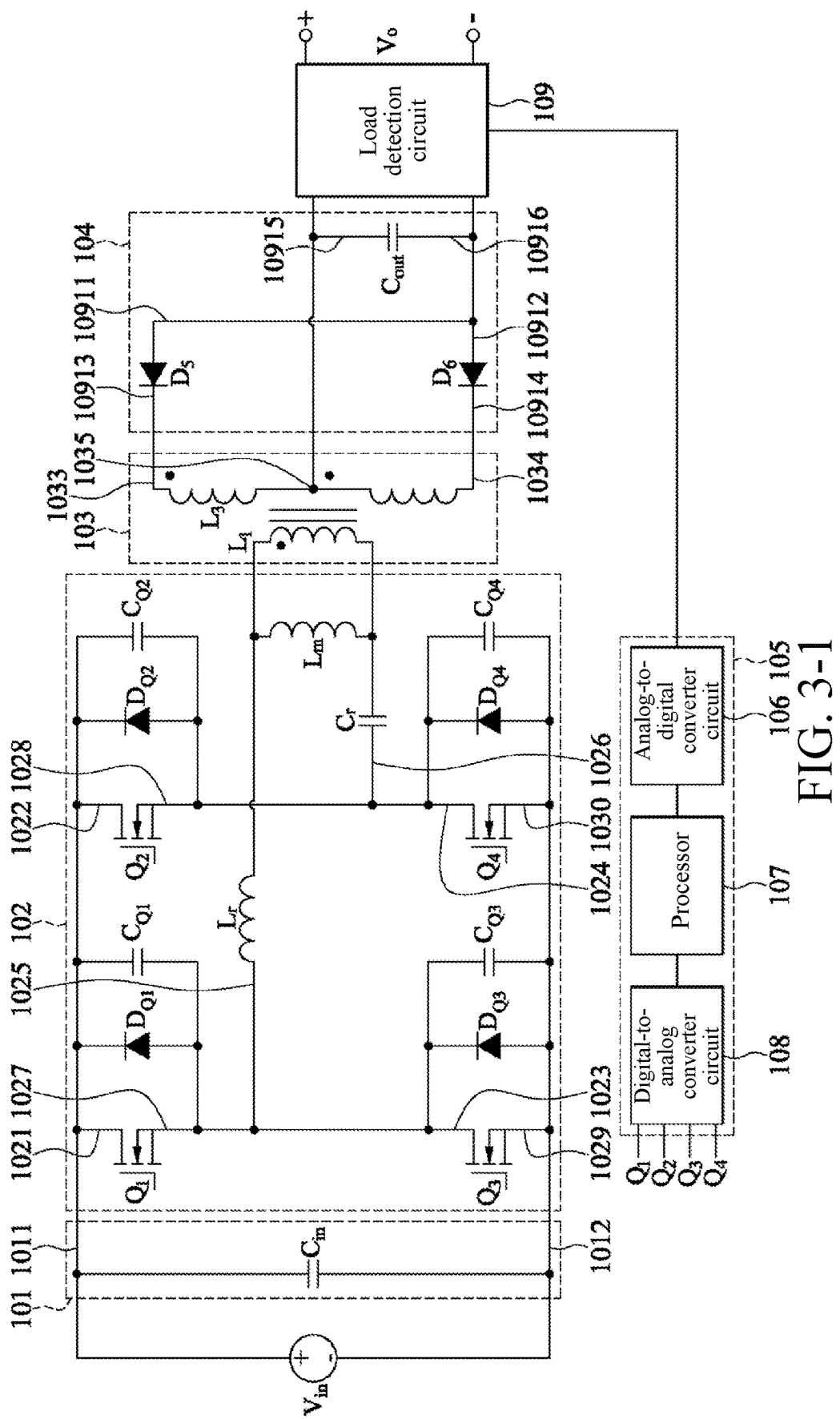
Figures 2, 3:
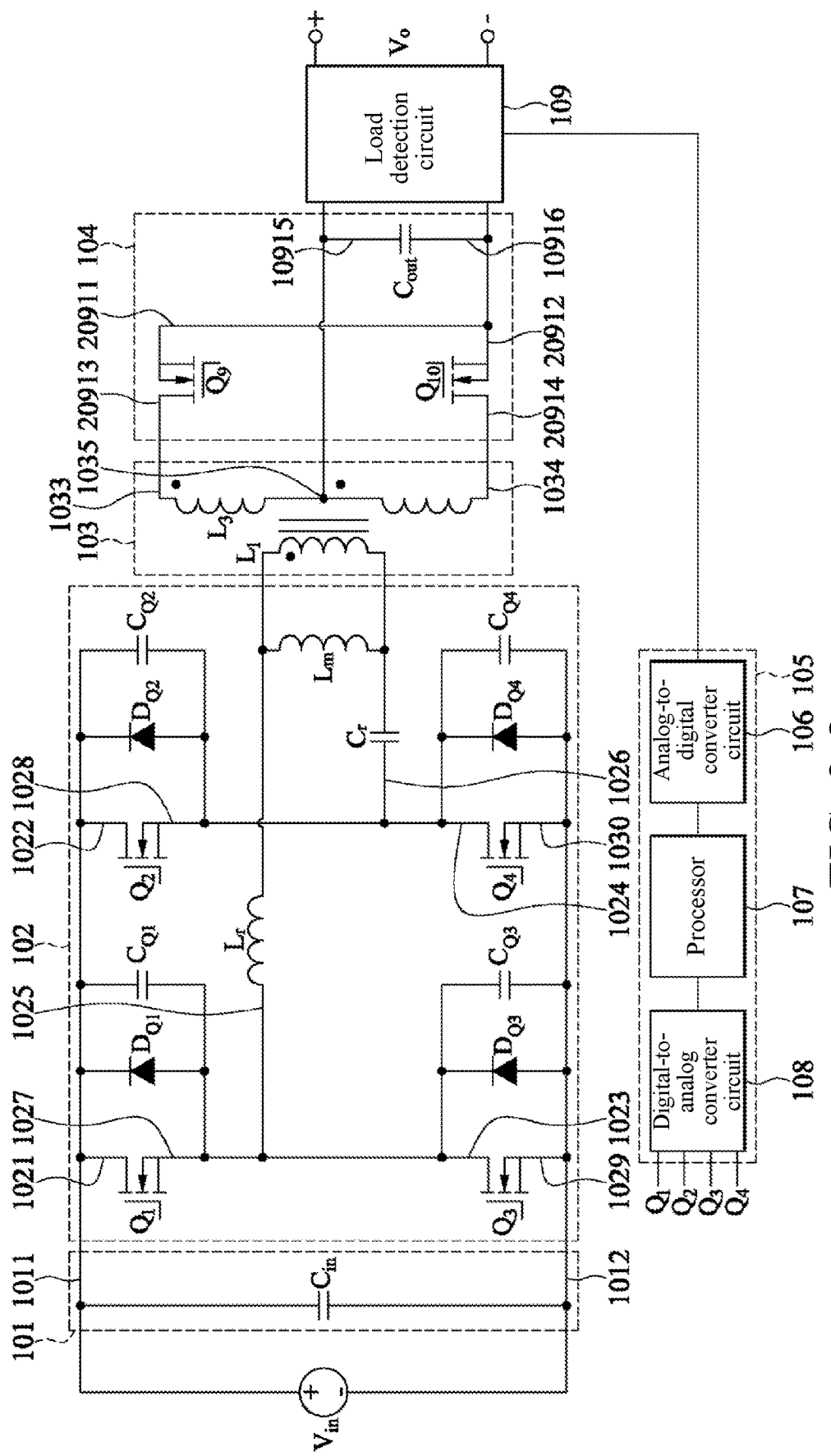

FIG. 3-1 is a circuit structure diagram of the resonance conversion device according to another embodiment of the present invention. Compared with the resonance conversion device shown in FIG. 2-1, the primary side of the transformer circuit 103 in the resonance conversion device 100 shown in FIG. 3-1 includes the primary coil $L_1$. The secondary side of the transformer circuit 103 includes a secondary coil $L_3$. The secondary coil $L_3$ includes a first end 1033, a second end 1034, and a center tap junction 1035. The rectifier filter circuit 104 is coupled to the secondary side of the transformer circuit 103 through the first end 1033, the second end 1034, and the center tap junction 1035 of the secondary coil $L_3$. The rectifier filter circuit 104 includes a first forward conduction element $D_5$, a second forward conduction element $D_6$, and a capacitor $C_{out}$. A second end 10913 of the first forward conduction element $D_5$ is coupled to the first end 1033 of the secondary coil $L_3$, and a second end 10914 of the second forward conduction element $D_6$ is coupled to the second end 1034 of the secondary coil $L_3$. A first end 10912 of the second forward conduction element $D_6$ is coupled to a second end 10916 of the capacitor $C_{out}$, and a first end 10911 of the first forward conduction element $D_5$ is coupled between the first end 10912 of the second forward conduction element $D_6$ and the second end 10916 of the capacitor $C_{out}$. A first end 10915 of the capacitor $C_{out}$ is coupled to the center tap junction 1035. A voltage across the capacitor $C_{out}$ serves as the DC output voltage of the rectifier filter circuit 104. A DC output voltage $V_o$ of the resonance conversion device 100 is the DC output voltage of the rectifier filter circuit 104.

FIG. 3-2 is a circuit structure diagram of the resonance conversion device according to an embodiment of the present invention. Referring to FIG. 3-2, compared with the resonance conversion device shown in FIG. 3-1, the rectifier filter circuit 104 in the resonance conversion device 100 shown in FIG. 3-2 includes a fifth switch $Q_9$, a sixth switch $Q_{10}$, and a capacitor $C_{out}$. A first end 20913 of the fifth switch $Q_9$ is coupled to a first end 1033 of the secondary coil $L_3$. A first end 20914 of the sixth switch $Q_{10}$ is coupled to the second end 1034 of the secondary coil $L_3$, and a second end 20912 of the sixth switch $Q_{10}$ is coupled to a second end 10916 of the capacitor $C_{out}$. A second end 20911 of the fifth switch is coupled between the second end 20912 of the sixth switch $Q_{10}$ and the second end 10916 of the capacitor $C_{out}$. A first end 10915 of the capacitor $C_{out}$ is coupled to the center tap junction 1035. A voltage across the capacitor $C_{out}$ serves as the DC output voltage of the rectifier filter circuit 104. A DC output voltage $V_o$ of the resonance conversion device 100 is the DC output voltage of the rectifier filter circuit 104. The controller 105 sends appropriate control signals to the fifth switch $Q_9$ and the sixth switch $Q_{10}$, to rectify the induced voltage.

In some embodiments of the present invention, the controller 105 sends appropriate control signals to the fifth switch $Q_9$ and the sixth switch $Q_{10}$, so that the fifth switch $Q_9$ and the sixth switch $Q_{10}$ behave the same as those of the first forward conduction element $D_5$ and the second forward conduction element $D_6$ shown in FIG. 3-1.

The full-bridge LLC converter circuit 102 has two operation modes. One is that the controller 105 simultaneously controls the first switch $Q_1$, the second switch $Q_2$, the third switch $Q_3$, and the fourth switch $Q_4$ to regulate the DC output voltage. This operation mode is referred to as a full-bridge operation mode. The other is that the controller 105 controls the second switch $Q_2$ to be turned off and controls the fourth switch $Q_4$ to be turned on. In this case, the second switch $Q_2$ acts as an open circuit, the fourth switch $Q_4$ acts as a short circuit, and the controller 105 controls only the first switch $Q_1$ and the third switch $Q_3$ to regulate the output DC voltage. This operation mode is referred to as a half-bridge operation mode.

Figure 4:
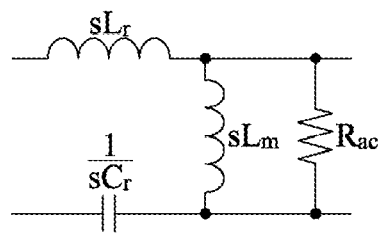
FIG. 4 is an equivalent circuit diagram of a series branch in a full-bridge LLC converter circuit according to an embodiment of the present invention.

FIG. 4 is an equivalent circuit diagram of a series branch in a full-bridge LLC converter circuit according to an embodiment of the present invention. Referring to FIG. 2-1 and FIG. 4 together, s in FIG. 4 is the Laplace operator, and a gain of the resonance tank of the full-bridge LLC converter circuit 102 is $$M(Q, m, F) = \frac{F^2(m-1)}{\sqrt{(m \cdot F^2 - 1)^2 + F^2 \cdot (F^2 - 1)^2 \cdot (m-1)^2 \cdot K^2}},$$

where $$Q = \frac{\sqrt{\frac{L_r}{C_r}}}{R_{ac}}$$

is a quality factor, $$R_{ac} = \frac{8}{\pi^2} \cdot \frac{N_1^2}{N_2^2} \cdot R_o$$

is a reflective load resistance, $R_o$ is an output impedance looking out from the capacitor $C_{out}$, $$F = \frac{f_s}{f_r}$$

is a normalized switching frequency, $$f_r = \frac{1}{2\pi\sqrt{L_r \cdot C_r}}$$

is a resonance frequency, $f_s$ is a switching frequency, and $$m = \frac{L_r + L_m}{L_r}.$$

A conversion gain of the full-bridge LLC converter circuit 102, the transformer circuit 103, and the rectifier filter circuit 104 can be decided by the following equation:

conversion gain=switching gain*resonance tank gain*ratio of number of turns of the primary coil $L_1$ to the secondary coil $L_2(N_2/N_1)$.

Figure 5:
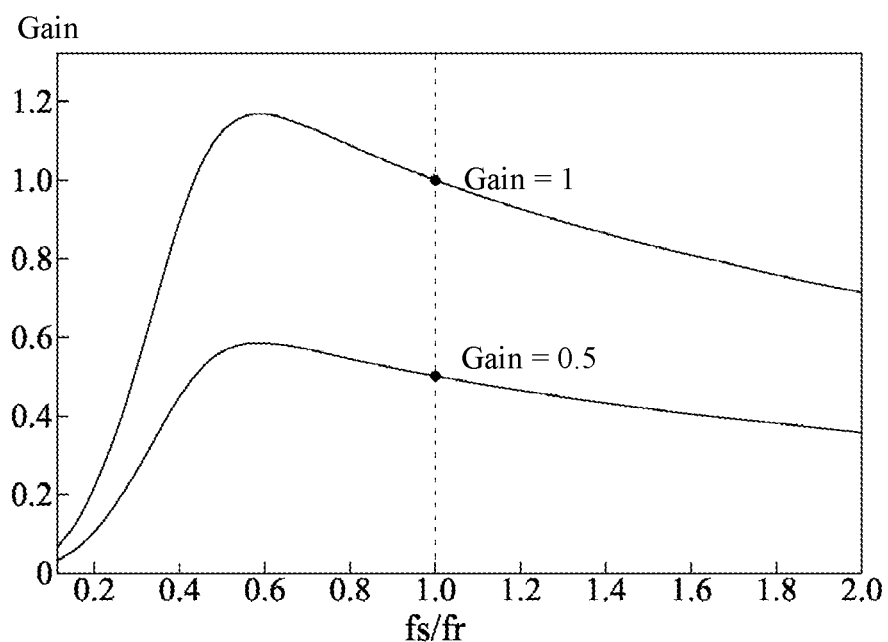
FIG. 5 is a response diagram of a product of a switching gain and a resonance tank gain and a normalized frequency according to an embodiment of the present invention.

The switching gain is 1 in the full-bridge operation mode, and is 0.5 in the half-bridge operation mode. That is, the conversion gain in the full-bridge operation mode is twice that in the half-bridge operation mode. FIG. 5 is a response diagram of a product of a switching gain and a resonance tank gain and a normalized frequency according to an embodiment of the present invention. In FIG. 5, m=6, Q=0.53, $L_r$=420 pH, $L_m$=2.1 mH, $C_r$=6.031 nF, and the ratio of the number of turns of the primary coil $L_1$ to the secondary coil $L_2$ is $N_1:N_2$=8:1. When the full-bridge LLC converter circuit 102 is in the full-bridge operation mode, the switching gain*resonance tank gain is 1 at the resonance frequency $f_r$. When the full-bridge LLC converter circuit 102 is in the half-bridge operation mode, the switching gain*resonance tank gain is 0.5 at the resonance frequency $f_r$. The switching gain*resonance tank gain is less than 1 when the switching frequency $f_s$ is greater than the resonance frequency $f_r$, and the switching gain*resonance tank gain decreases when the switching frequency $f_s$ increases. It should be noted that, when the switching frequency $f_s$ is greater than or equal to the resonance frequency $f_r$, the first switch $Q_1$, the second switch $Q_2$, the third switch $Q_3$, and the fourth switch $Q_4$ in the full-bridge LLC converter circuit 102 have a zero-voltage switching characteristic. Therefore, in the following embodiments, the full-bridge LLC converter circuit 102 operates in an interval where the switching frequency is greater than or equal to the resonance frequency $f_r$.

The processor 107 transmits, to the digital-to-analog converter circuit 108, the control signals to be transmitted to the first switch $Q_1$, the second switch $Q_2$, the third switch $Q_3$, and the fourth switch $Q_4$ of the full-bridge LLC converter circuit 102. The digital-to-analog converter circuit 108 converts the received control signals into appropriate drive signals, and then transmits the drive signals to the first switch $Q_1$, the second switch $Q_2$, the third switch $Q_3$, and the fourth switch $Q_4$ of the full-bridge LLC converter circuit 102, to drive the first switch $Q_1$, the second switch $Q_2$, the third switch $Q_3$, and the fourth switch $Q_4$.

Figure 6:
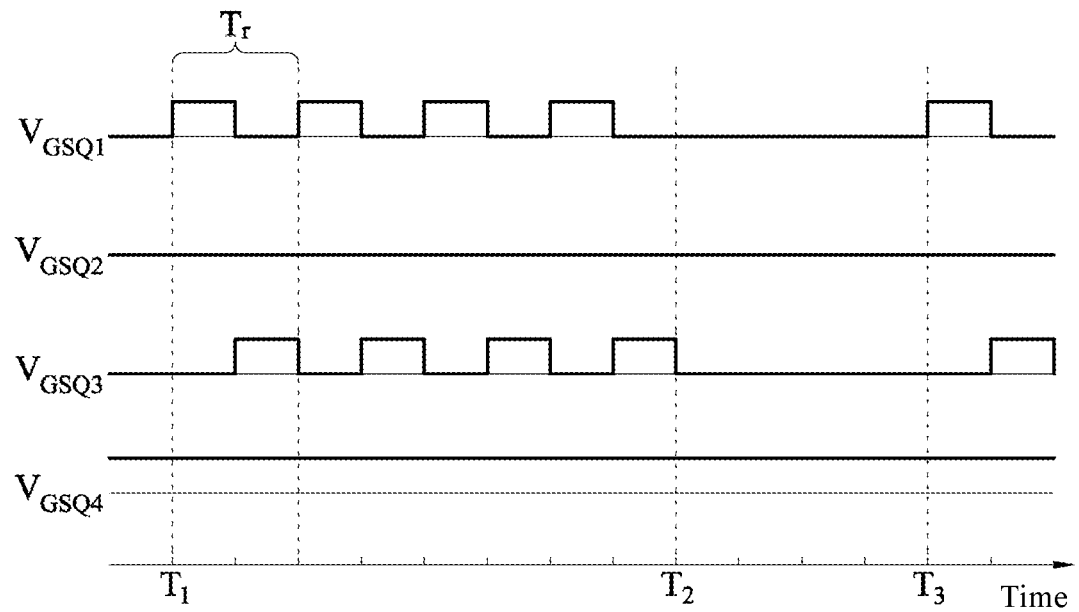
FIG. 6 is a timing diagram of a switch control signal according to an embodiment of the present invention.
Figure 7:
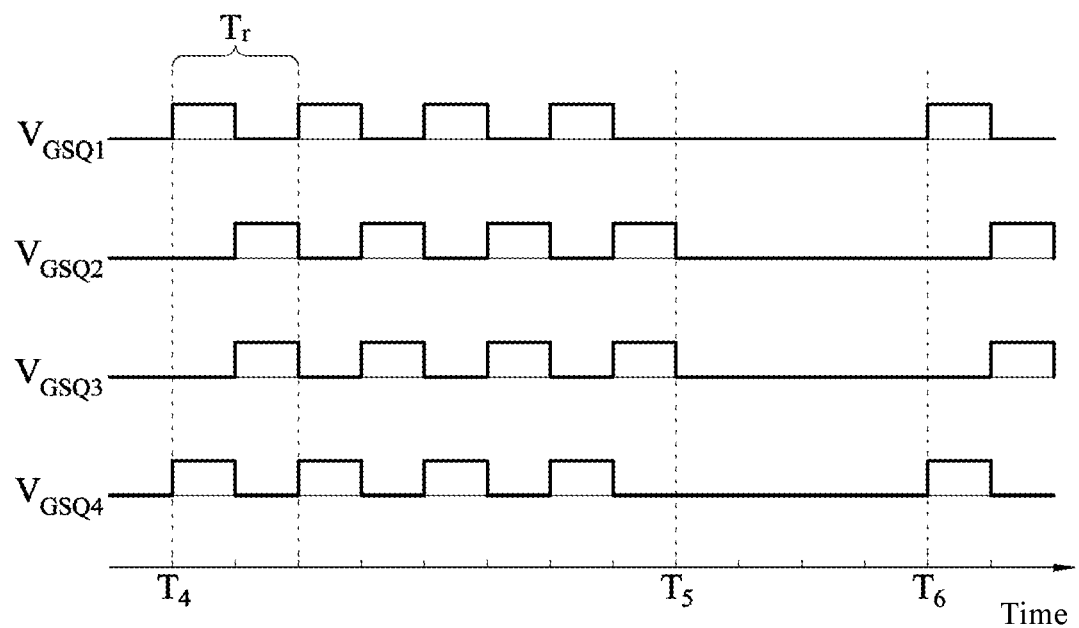
FIG. 7 is a timing diagram of a switch control signal according to an embodiment of the present invention.
Figure 10:
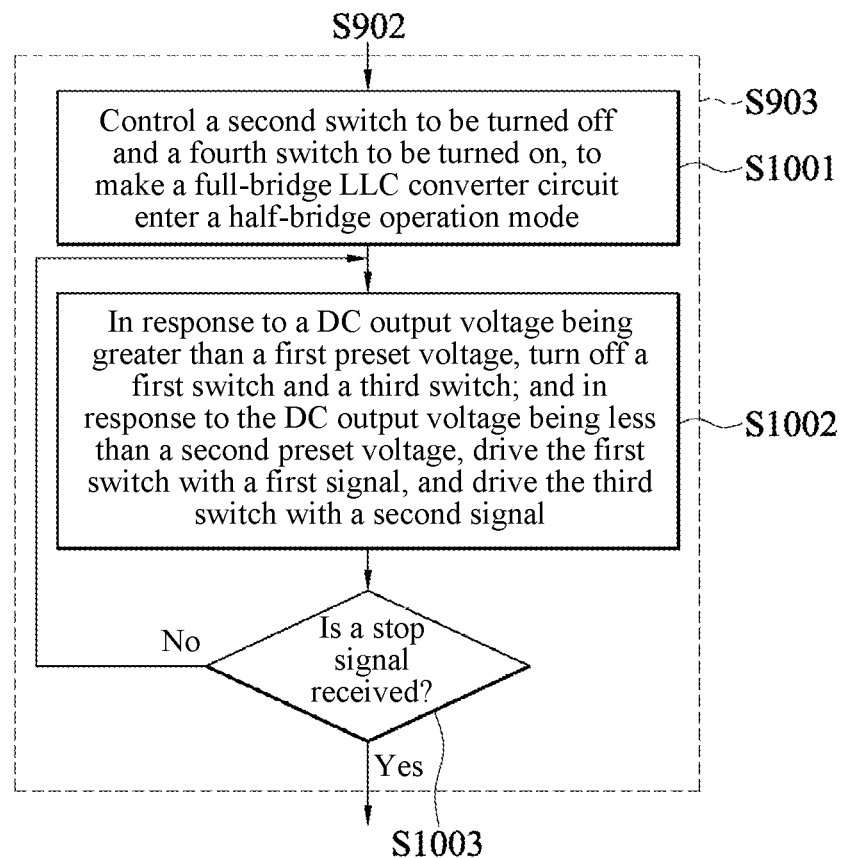
FIG. 10 is a control flow chart according to an embodiment of the present invention.
Figure 11:
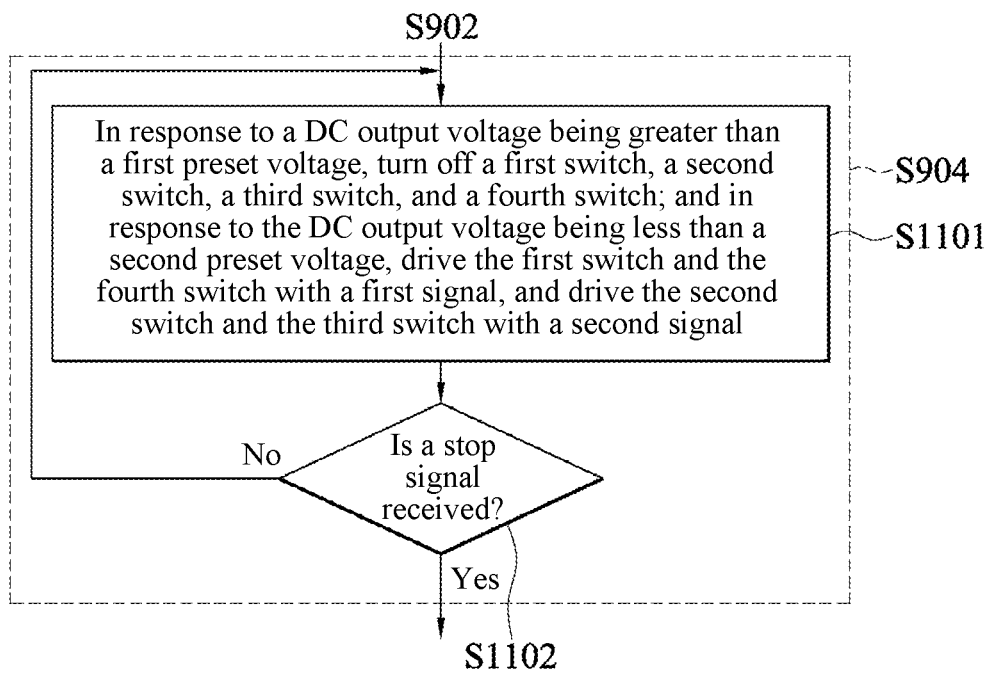
FIG. 11 is a control flow chart according to an embodiment of the present invention.

FIG. 6 is a timing diagram of a switch control signal according to an embodiment of the present invention. FIG. 7 is a timing diagram of a switch control signal according to an embodiment of the present invention. FIG. 10 is a control flow chart according to an embodiment of the present invention. FIG. 11 is a control flow chart according to an embodiment of the present invention. Refer to FIG. 2-1, FIG. 6, FIG. 7, FIG. 10, and FIG. 11 together. $V_{GSQ1}$ recorded in FIG. 6 represents a voltage between a gate and a source of the first switch $Q_1$, $V_{GSQ2}$ represents a voltage between a gate and a source of the second switch $Q_2$, $V_{GSQ3}$ represents a voltage between a gate and a source of the third switch $Q_3$, and $V_{GSQ4}$ represents a voltage between a gate and a source of the fourth switch $Q_4$.

As shown in FIG. 10, the foregoing step S903 further includes step S1001 and step S1002. In step S1001, in response to the indication voltage being less than or equal to a threshold value, the processor 107 makes the digital-to-analog converter circuit 108 transmit the drive signals of $V_{GSQ2}$ and $V_{GSQ4}$ recorded in FIG. 6, to control the voltage between the gate and the source of the second switch $Q_2$ and the voltage between the gate and the source of the fourth switch $Q_4$, to turn off the second switch $Q_2$ and turn on the fourth switch $Q_4$. In this case, the full-bridge LLC converter circuit 102 enters the half-bridge operation mode.

In step S1002, the controller 105 detects the DC output voltage of the rectifier filter circuit 104. When the DC output voltage is greater than a first preset voltage, the processor 107 makes the digital-to-analog converter circuit 108 transmit the drive signals having signal waveforms of $V_{GSQ1}$ and $V_{GSQ3}$ before a time point $T_1$ as recorded in FIG. 6, to control the voltage between the gate and the source of the first switch $Q_1$ and the voltage between the gate and the source of the third switch $Q_3$, thereby turning off the first switch $Q_1$ and the third switch $Q_3$.

When the controller 105 detects that the DC output voltage is less than a second preset voltage, the processor 107 makes the digital-to-analog converter circuit 108 transmit a first signal (a signal waveform of $V_{GSQ1}$ from the time point $T_1$ to the time point $T_2$ as recorded in FIG. 6) to drive the first switch $Q_1$, and transmit a second signal (a signal waveform of $V_{GSQ3}$ from the time point $T_1$ to the time point $T_2$ as recorded in FIG. 6) to drive the third switch $Q_3$, as shown from the time point $T_1$ to a time point $T_2$ recorded in FIG. 6. The first signal and the second signal are periodic pulse signals in which a duty cycle is 50% and a frequency is a burst mode frequency, and the first signal and the second signal are complementary. The burst mode frequency is $$\frac{1}{T_r},$$

and $T_r$ is a cycle of the first signal and the second signal. When the controller 105 detects that the DC output voltage is greater than the first preset voltage again at the time point $T_2$, the processor 107 makes the digital-to-analog converter circuit 108 transmit drive signals having signal waveforms of $V_{GSQ1}$ and $V_{GSQ3}$ from the time point $T_2$ to a time point $T_3$ as recorded in FIG. 6, to control the voltage between the gate and the source of the first switch $Q_1$ and the voltage between the gate and the source of the third switch $Q_3$, to turn off the first switch $Q_1$ and the third switch $Q_3$.

The first preset voltage is greater than the indication voltage, the second preset voltage is less than the indication voltage, and the controller 105 controls the DC output voltage to be within a range of the first preset voltage and the second preset voltage. Actual values of the first preset voltage and the second preset voltage are set according to design specifications.

In step S1003, the controller 105 continues performing step S1002 until the processor 107 receives a stop signal.

As shown in FIG. 11, step S904 further includes step S1101 and step S1102. In step S1101, the controller 105 detects the DC output voltage of the rectifier filter circuit 104. When the DC output voltage is greater than the first preset voltage, the processor 107 makes the digital-to-analog converter circuit 108 transmit drive signals having signal waveforms of $V_{GSQ1}$, $V_{GSQ2}$, $V_{GSQ3}$, and $V_{GSQ4}$ before the time point $T_1$ as recorded in FIG. 7, to control the voltages between the gates and the sources of the first switch $Q_1$, the second switch $Q_2$, the third switch $Q_3$, and the fourth switch $Q_4$, to turn off the first switch $Q_1$, the second switch $Q_2$, the third switch $Q_3$, and the fourth switch $Q_4$.

When the controller 105 detects that the DC output voltage is less than the second preset voltage, the processor 107 makes the digital-to-analog converter circuit 108 transmit a first signal (a signal waveform of $V_{GSQ1}$ from the time point $T_4$ to the time point $T_5$ as recorded in FIG. 7) to drive the first switch $Q_1$ and the fourth switch $Q_4$, and transmit a second signal (a signal waveform of $V_{GSQ2}$ from the time point $T_4$ to the time point $T_5$ as recorded in FIG. 7) to drive the second switch $Q_2$ and the third switch $Q_3$, as shown from a time point $T_4$ to a time point $T_5$ recorded in FIG. 7. The first signal and the second signal are periodic pulse signals in which a duty cycle is 50% and a frequency is a burst mode frequency, and the first signal and the second signal are complementary. The burst mode frequency is $$\frac{1}{T_r},$$

and $T_r$ is a cycle of the first signal and the second signal.

In some embodiments of the present invention, the burst mode frequency is selected as the resonance frequency $$f_r = \frac{1}{2\pi\sqrt{L_r \cdot C_r}}.$$

In some embodiments of the present invention, the burst mode frequency includes the resonance frequency of the resonance conversion device. In some embodiments of the present invention, the burst mode frequency includes the resonance frequency $$f_r = \frac{1}{2\pi\sqrt{L_r \cdot C_r}}$$

of the full-bridge LLC converter circuit 102.

In some embodiments of the present invention, the threshold value is half of a designed maximum output voltage of the resonance conversion device 100 at an operation point at the resonance frequency $$f_r = \frac{1}{2\pi\sqrt{L_r \cdot C_r}}.$$

For example, in order to cover the foregoing indication voltages 5 V, 9 V, 15 V, 20 V, 28 V, 36 V, and 48 V, the maximum output voltage of the resonance conversion device 100 at the operation point at the resonance frequency $$f_r = \frac{1}{2\pi\sqrt{L_r \cdot C_r}}$$

is designed to be 50 V, and the threshold value is selected to be 25 V.

Figure 8:
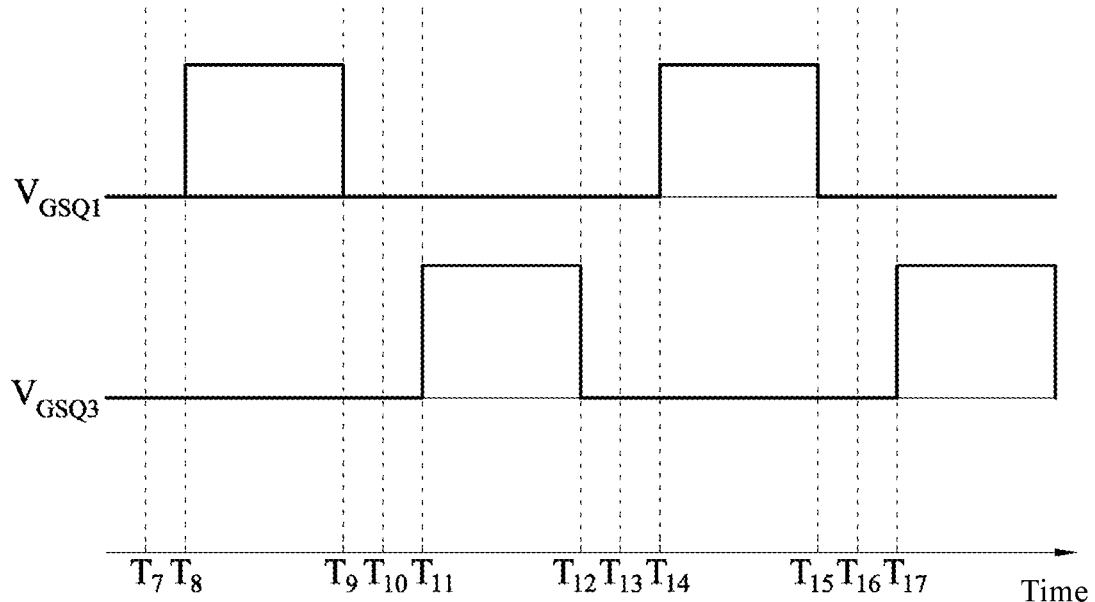
FIG. 8 is a timing diagram of a switch control signal according to an embodiment of the present invention.

FIG. 8 is a timing diagram of a switch control signal according to an embodiment of the present invention. Referring to FIG. 2-1, FIG. 6, FIG. 7, and FIG. 8 together, if the first switch $Q_1$ and the third switch $Q_3$ are simultaneously turned on or the second switch $Q_2$ and the fourth switch $Q_4$ are simultaneously turned on, a large current may be generated to damage the first switch $Q_1$ and the third switch $Q_3$ or the second switch $Q_2$ and the fourth switch $Q_4$. Therefore, the first signal (the signal waveform of $V_{GSQ1}$ from the time point $T_1$ to the time point $T_2$ as recorded in FIG. 6) and the second signal (the signal waveform of $V_{GSQ3}$ from the time point $T_1$ to the time point $T_2$ as recorded in FIG. 6) recorded in FIG. 6 and FIG. 7 are designed as waveforms of $V_{GSQ1}$ and $V_{GSQ3}$ as shown in FIG. 8. A dead time is set from a time point $T_7$ to a time point $T_8$ (corresponding to a time point $T_{13}$ to a time point $T_{14}$), from a time point $T_9$ to a time point $T_{10}$ (corresponding to a time point $T_{15}$ to a time point $T_{16}$), from a time point $T_{10}$ to a time point $T_{11}$ (corresponding to a time point $T_{16}$ to a time point TO, and from a time point $T_{12}$ to the time point $T_{13}$. In the dead time, the controller 105 controls $V_{GSQ1}$, $V_{GSQ2}$, $V_{GSQ3}$, and $V_{GSQ4}$ to be at a low level, to turn off the first switch $Q_1$, the second switch $Q_2$, the third switch $Q_3$, and the fourth switch $Q_4$, so as to avoid simultaneously turning on the first switch $Q_1$ and the third switch $Q_3$ or simultaneously turning on the second switch $Q_2$ and the fourth switch $Q_4$ to destroy the first switch $Q_1$ and the third switch $Q_3$ or the second switch $Q_2$ and the fourth switch $Q_4$.

In some embodiments of the present invention, the duty cycle of the first signal and the second signal without the dead time is 50%.

Figure 13:
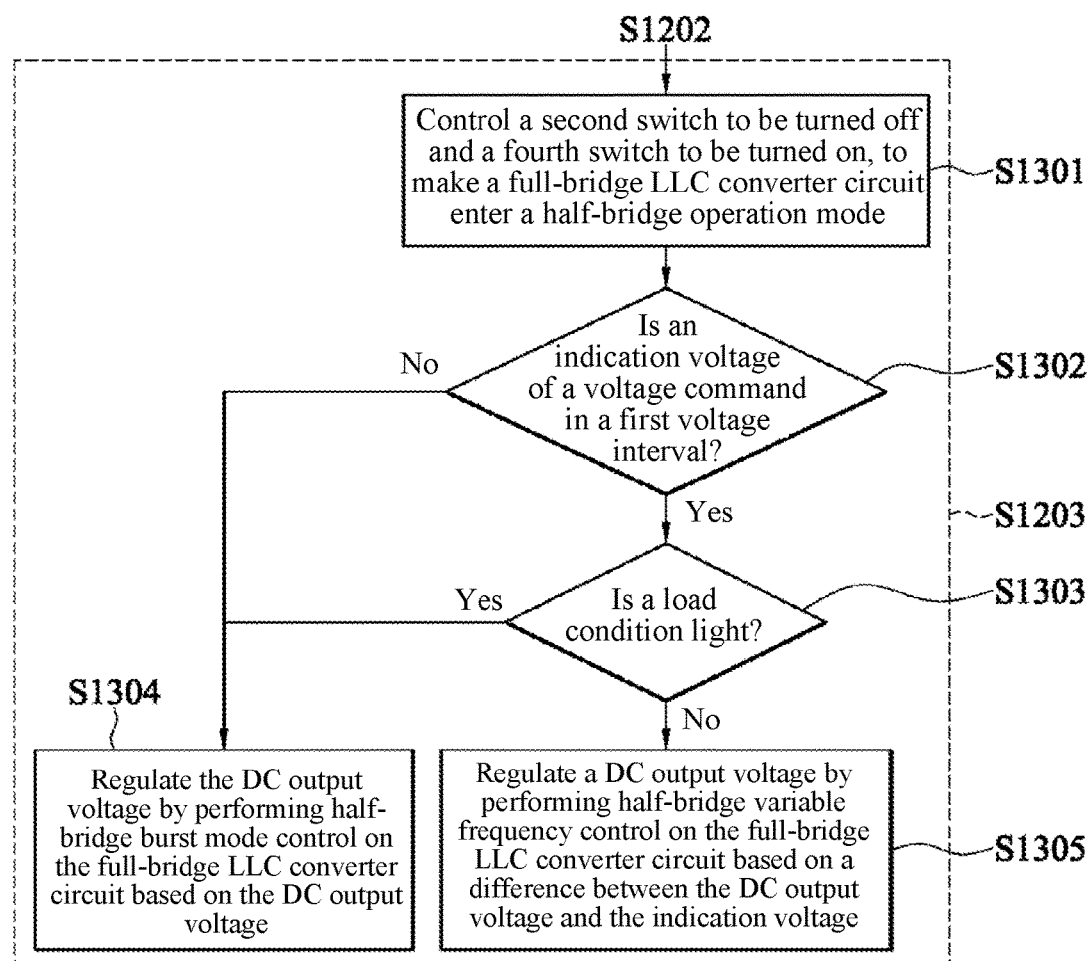
FIG. 13 is a control flow chart according to an embodiment of the present invention.

FIG. 13 is a control flow chart according to an embodiment of the present invention. Referring to FIG. 6 and FIG. 13 together, as shown in FIG. 13, the foregoing step S1203 further includes steps S1301 to S1305. In step S1301, in response to the indication voltage being less than or equal to the threshold value, the processor 107 makes the digital-to-analog converter circuit 108 transmit the drive signals of $V_{GSQ2}$ and $V_{GSQ4}$ recorded in FIG. 6, to control the voltage between the gate and the source of the second switch $Q_2$ and the voltage between the gate and the source of the fourth switch $Q_4$, to turn off the second switch $Q_2$ and turn on the fourth switch $Q_4$. In this case, the full-bridge LLC converter circuit 102 enters the half-bridge operation mode.

In step S1302, the processor 107 determines whether the indication voltage of the voltage command is in a first voltage interval. If the processor 107 determines that the indication voltage of the voltage command is not in the first voltage interval, step S1304 is performed. If the processor 107 determines that the indication voltage of the voltage command is in the first voltage interval, step S1303 is performed. In step S1303, whether the load condition is light is further determined, if yes, step S1304 is performed, and if not, step S1305 is performed. In step S1304, the processor 107 regulates the DC output voltage by performing half-bridge burst mode control on the full-bridge LLC converter circuit 102 based on the DC output voltage. In step S1305, the processor 107 regulates the DC output voltage by performing half-bridge variable frequency control on the full-bridge LLC converter circuit 102 based on a difference between the DC output voltage and the indication voltage.

Figure 14:
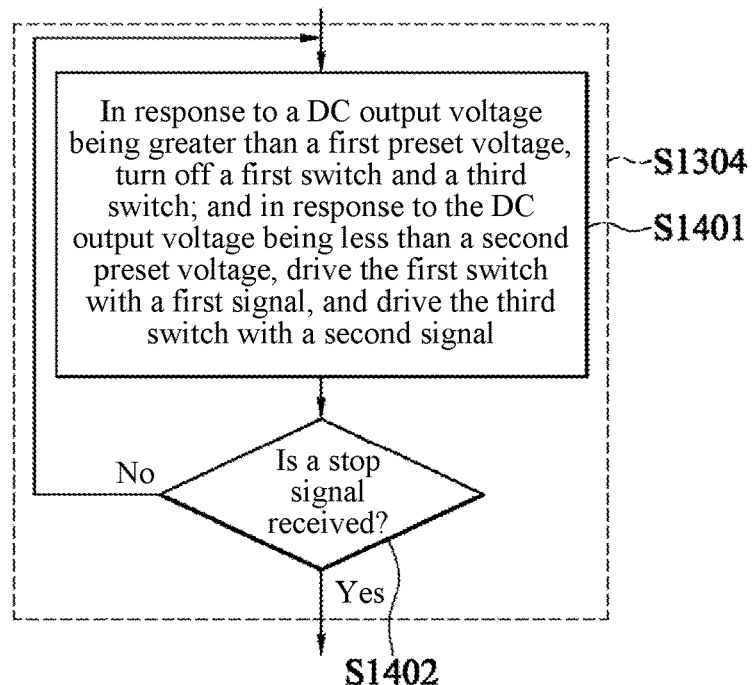
FIG. 14 is a control flow chart according to an embodiment of the present invention.

FIG. 14 is a control flow chart according to an embodiment of the present invention. Refer to FIG. 6 and FIG. 14 together. As shown in FIG. 14, step S1304 further includes step S1401 and step S1402. In step S1401, the controller 105 detects the DC output voltage of the rectifier filter circuit 104. When the DC output voltage is greater than the first preset voltage, the processor 107 makes the digital-to-analog converter circuit 108 transmit the drive signals having signal waveforms of $V_{GSQ1}$ and $V_{GSQ3}$ before the time point $T_1$ as recorded in FIG. 6, to control the voltage between the gate and the source of the first switch $Q_1$ and the voltage between the gate and the source of the third switch $Q_3$, to turn off the first switch $Q_1$ and the third switch $Q_3$.

When the controller 105 detects that the DC output voltage is less than the second preset voltage, the processor 107 makes the digital-to-analog converter circuit 108 transmit the first signal (the signal waveform of $V_{GSQ1}$ from the time point $T_1$ to the time point $T_2$ as recorded in FIG. 6) to drive the first switch $Q_1$, and transmit the second signal (the signal waveform of $V_{GSQ3}$ from the time point $T_1$ to the time point $T_2$ as recorded in FIG. 6) to drive the third switch $Q_3$, as shown from the time point $T_1$ to the time point $T_2$ recorded in FIG. 6. The first signal and the second signal are periodic pulse signals in which a duty cycle is 50% and a frequency is a burst mode frequency, and the first signal and the second signal are complementary. The burst mode frequency is $$\frac{1}{T_r},$$

and $T_r$ is a cycle of the first signal and the second signal. When the controller 105 detects that the DC output voltage is greater than the first preset voltage again at the time point $T_2$, the processor 107 makes the digital-to-analog converter circuit 108 transmit drive signals having signal waveforms of $V_{GSQ1}$ and $V_{GSQ3}$ from the time point $T_2$ to a time point $T_3$ as recorded in FIG. 6, to control the voltage between the gate and the source of the first switch $Q_1$ and the voltage between the gate and the source of the third switch $Q_3$, to turn off the first switch $Q_1$ and the third switch $Q_3$.

In step S1402, the controller 105 continues performing step S1401 until the processor 107 receives a stop signal.

Figure 15:
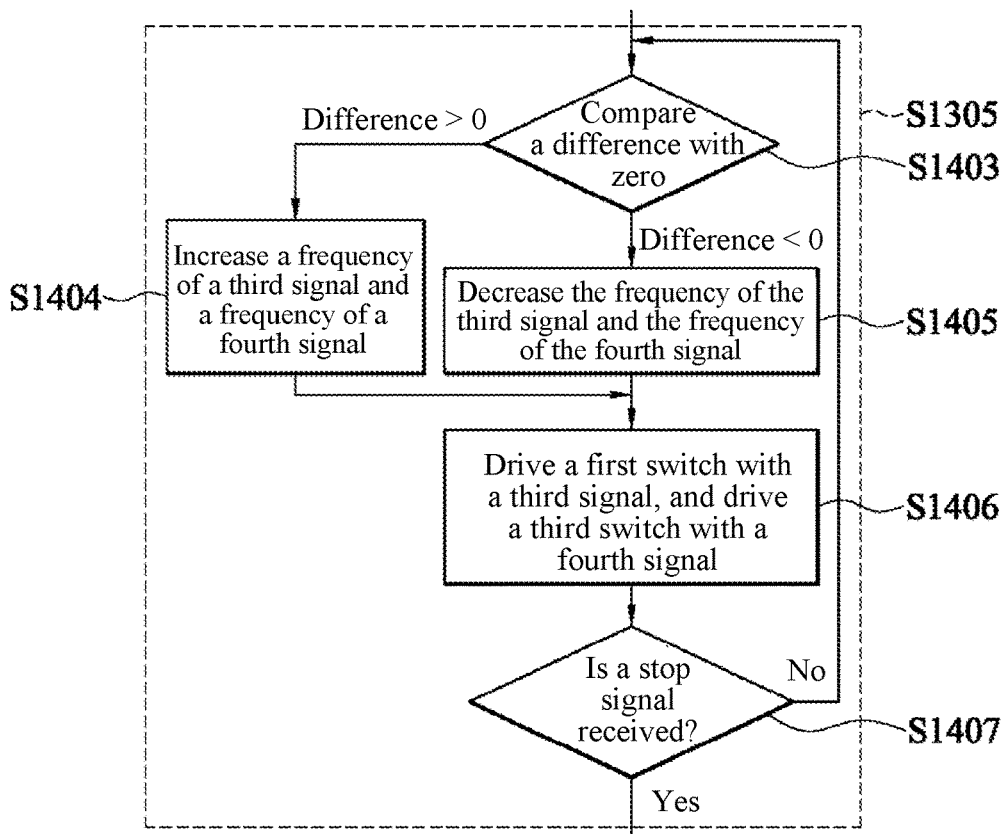
FIG. 15 is a control flow chart according to an embodiment of the present invention.

FIG. 15 is a control flow chart according to an embodiment of the present invention. As shown in FIG. 15, the foregoing step S1305 further includes steps S1403 to S1407. In this embodiment, the processor 107 makes the digital-to-analog converter circuit 108 transmit a third signal to drive the first switch $Q_1$ and transmit a fourth signal to drive the third switch $Q_3$. The third signal and the fourth signal are variable frequency periodic pulse signals having a duty cycle of 50%, and the third signal and the fourth signal are complementary. In step S1403, the processor 107 determines whether the difference between the DC output voltage and the preset voltage is greater than 0. If the difference between the DC output voltage and the preset voltage is greater than 0, step S1404 is performed. In step S1404, the processor 107 increases a frequency of the third signal and a frequency of the fourth signal. If the difference between the DC output voltage and the preset voltage is less than 0, step S1405 is performed. In step S1405, the processor 107 decreases the frequency of the third signal and the frequency of the fourth signal. If the difference between the DC output voltage and the preset voltage is 0, the frequency of the third signal and the frequency of the fourth signal are not changed.

In step S1406, the processor 107 makes the digital-to-analog converter circuit 108 transmit the third signal to drive the first switch $Q_1$ and transmit the fourth signal to drive the third switch $Q_3$. In step S1407, the controller 105 continues performing the foregoing steps S1403 to S1406 until the processor 107 receives a stop signal.

Figure 16:
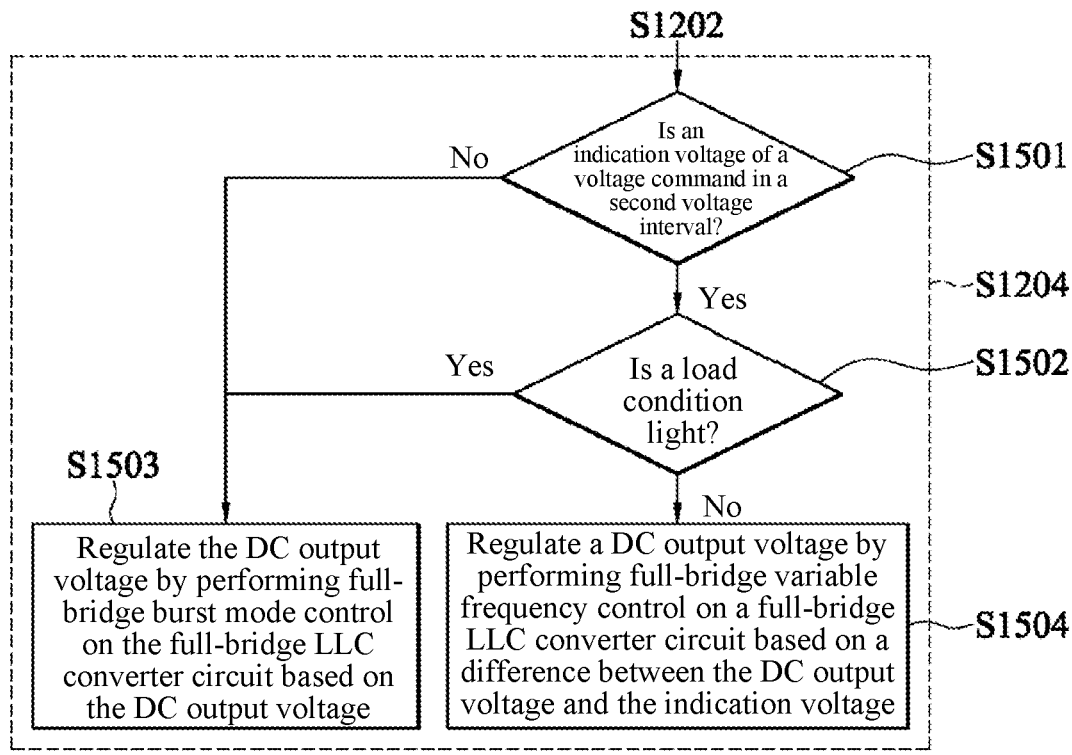
FIG. 16 is a control flow chart according to an embodiment of the present invention.

FIG. 16 is a control flow chart according to an embodiment of the present invention. Referring to FIG. 7 and FIG. 16 together, as shown in FIG. 16, the foregoing step S1204 further includes steps S1501 to S1504. In step S1501, the processor 107 determines whether the indication voltage of the voltage command is in a second voltage interval. If the processor 107 determines that the indication voltage of the voltage command is not in the second voltage interval, step S1503 is performed. If the processor 107 determines that the indication voltage of the voltage command is in the second voltage interval, step S1502 is performed. In step S1502, whether the load condition is light is further determined, if yes, step S1503 is performed, and if not, step S1504 is performed. In step S1503, the processor 107 regulates the DC output voltage by performing full-bridge burst mode control on the full-bridge LLC converter circuit 102 based on the DC output voltage. In step S1504, the DC output voltage is regulated by performing full-bridge variable frequency control on the full-bridge LLC converter circuit 102 based on the difference between the DC output voltage and the indication voltage.

Figure 17:
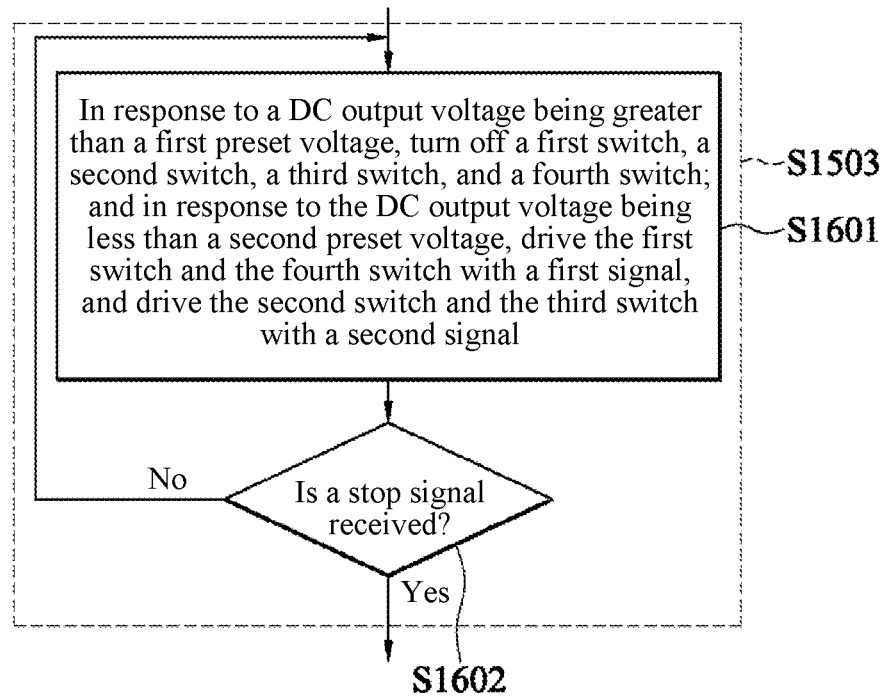
FIG. 17 is a control flow chart according to an embodiment of the present invention.

FIG. 17 is a control flow chart according to an embodiment of the present invention. As shown in FIG. 17, step S1503 further includes step S1601 and step S1602. Because step S1601 is the same as the foregoing step S1101, and step S1602 is the same as the foregoing step S1102, the description is not repeated here.

Figure 18:
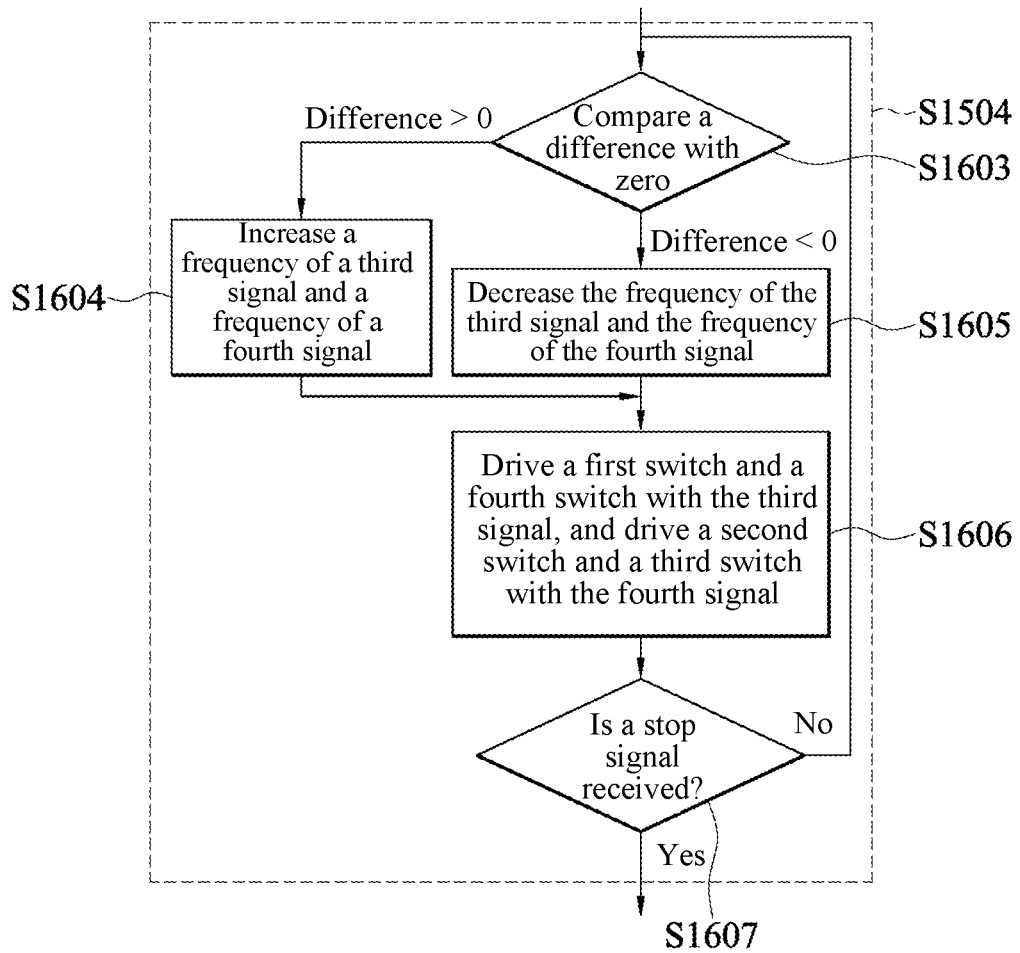
FIG. 18 is a control flow chart according to an embodiment of the present invention.

FIG. 18 is a control flow chart according to an embodiment of the present invention. As shown in FIG. 18, the foregoing step S1504 further includes steps S1603 to S1607. In this embodiment, the processor 107 makes the digital-to-analog converter circuit 108 transmit a third signal to drive the first switch $Q_1$ and the fourth switch $Q_4$ and transmit a fourth signal to drive the second switch $Q_2$ and the third switch $Q_3$. The third signal and the fourth signal are variable frequency periodic pulse signals having a duty cycle of 50%, and the third signal and the fourth signal are complementary. In step S1603, the processor 107 determines whether the difference between the DC output voltage and the preset voltage is greater than 0. If the difference between the DC output voltage and the preset voltage is greater than 0, step S1604 is performed. In step S1604, the processor 107 increases the frequency of the third signal and the frequency of the fourth signal. If the difference between the DC output voltage and the preset voltage is less than 0, step S1605 is performed. In step S1605, the processor 107 decreases the frequency of the third signal and the frequency of the fourth signal. If the difference between the DC output voltage and the preset voltage is 0, the frequency of the third signal and the frequency of the fourth signal are not changed.

In step S1606, the processor 107 makes the digital-to-analog converter circuit 108 transmit the third signal to drive the first switch $Q_1$ and the fourth switch $Q_4$ and transmit the fourth signal to drive the second switch $Q_2$ and the third switch $Q_3$. In step S1607, the controller 105 continues performing the foregoing steps S1603 to S1606 until the processor 107 receives a stop signal.

In some embodiments of the present invention, the burst mode frequency is selected as the resonance frequency $$f_r = \frac{1}{2\pi\sqrt{L_r \cdot C_r}}.$$

In some embodiments of the present invention, the burst mode frequency includes the resonance frequency of the resonance conversion device. In some embodiments of the present invention, the burst mode frequency includes the resonance frequency $$f_r = \frac{1}{2\pi\sqrt{L_r \cdot C_r}}$$

of the full-bridge LLC converter circuit 102.

In some embodiments of the present invention, the second voltage interval is an interval including the maximum output voltage of the resonance conversion device 100 at the operation point at the resonance frequency $$f_r = \frac{1}{2\pi\sqrt{L_r \cdot C_r}},$$

and the first voltage interval is an interval including the threshold value. In the embodiment in which the maximum output voltage of the resonance conversion device 100 at the operation point at the resonance frequency $f_r$ is designed to be 50 V and the threshold value is selected to be 25 V, the second voltage interval ranges from 48 to 50 V, and the first voltage interval ranges from 24 to 25 V.

Figure 19:
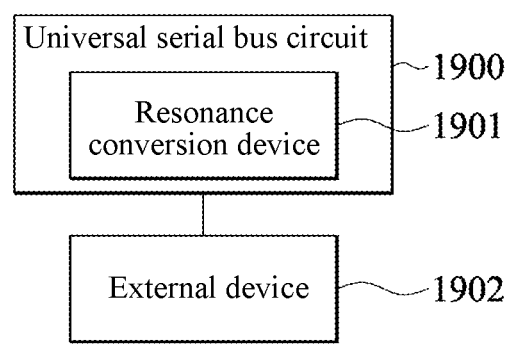
FIG. 19 is a block diagram of a USB circuit and an external device according to an embodiment of the present invention.

FIG. 19 is a block diagram of a universal serial bus (USB) circuit and an external device according to an embodiment of the present invention. Referring to FIG. 19, the universal serial bus circuit 1900 includes a resonance conversion device 1901. The resonance conversion device 1901 may be the resonance conversion device 100 described in any of the foregoing embodiments. The universal serial bus circuit 1900 is connected to the external device 1902. The universal serial bus circuit 1900 sends a voltage command to the resonance conversion device 1901 according to a requirement of the external device 1902, so that the resonance conversion device 1901 provides a fixed voltage to the external device 1902.

Figure 20:
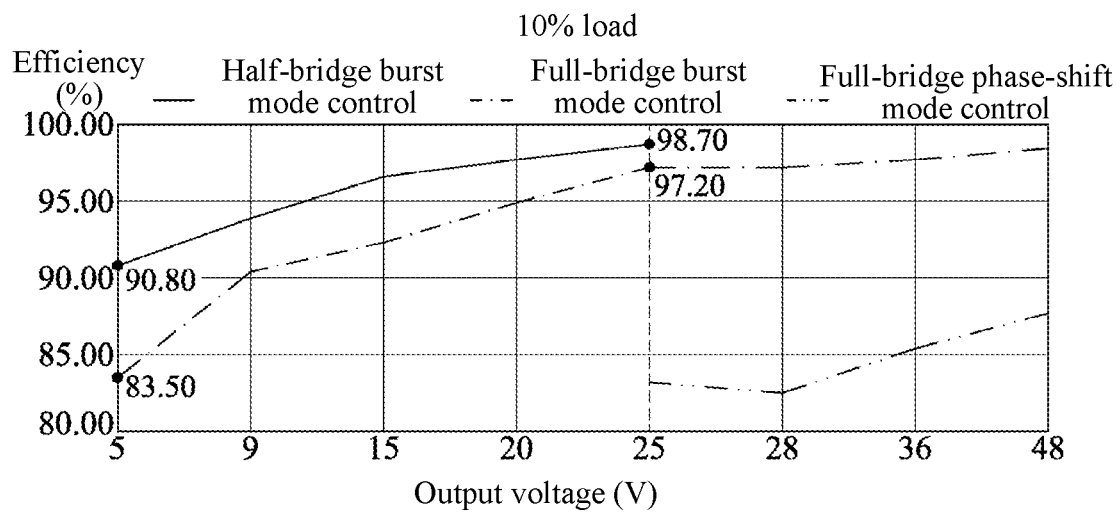
FIG. 20 is an efficiency comparison diagram of the resonance conversion device at light load.
Figure 21:
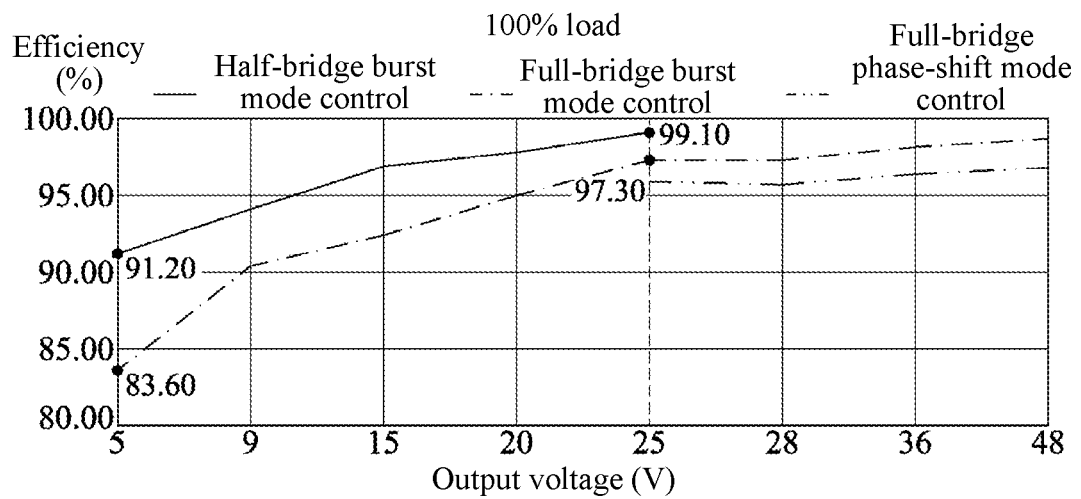
FIG. 21 is an efficiency comparison diagram of the resonance conversion device at heavy load.

FIG. 20 is an efficiency comparison diagram of the resonance conversion device at light load. FIG. 21 is an efficiency comparison diagram of the resonance conversion device at heavy load. Refer to FIG. 20 and FIG. 21 together. FIG. 20 and FIG. 21 are efficiency comparison diagrams of different control methods at 10% load and 100% load respectively, which are based on the resonance conversion device 100 recorded in FIG. 2-1 and use an example in which m=6, Q=0.53, $L_r$=420 pH, $L_m$=2.1 mH, $C_r$=6.031 nF, and the ratio of the number of turns of the primary coil $L_1$ to the secondary coil $L_2$ is $N_1$:$N_2$=8:1. As shown in FIG. 20, at 10% load, the efficiency of using the half-bridge burst mode control is better than that of using the full-bridge burst mode control below 25 V. At 25 V~48 V, the efficiency of using the full-bridge burst mode control is better than that of using the conventional full-bridge phase-shift mode control. As shown in FIG. 21, at 100% load, the efficiency of using the half-bridge burst mode control is better than that of using the full-bridge burst mode control below 25 V. At 25 V~48 V, the efficiency of using the full-bridge burst mode control is better than that of using the conventional full-bridge phase-shift mode control. The results shown in FIG. 20 and FIG. 21 may verify that the control method of the resonance conversion device shown in FIG. 9 has good efficiency.

Figure 22:
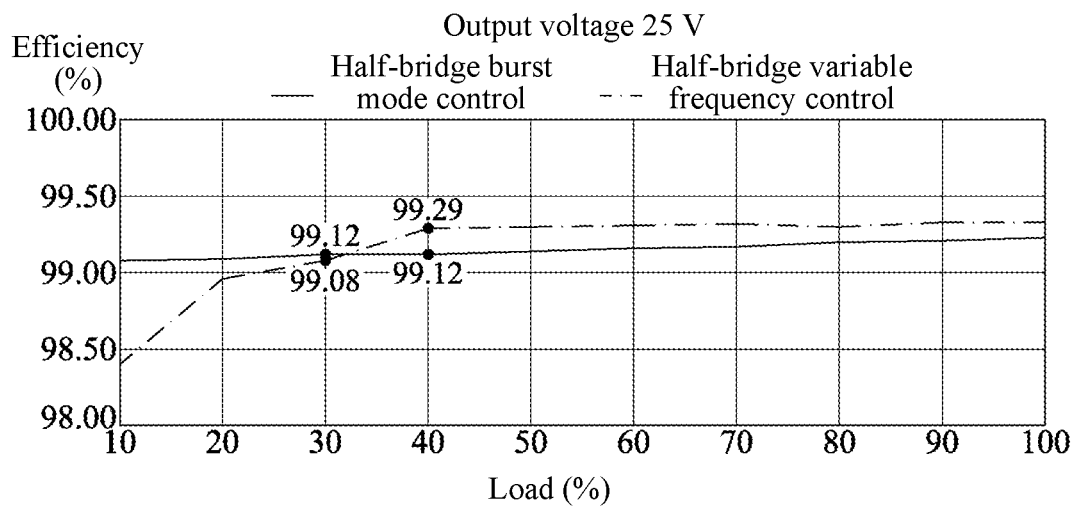
FIG. 22 is an efficiency comparison diagram of half-bridge burst mode control and half-bridge variable frequency control of the resonance conversion device.
Figure 23:
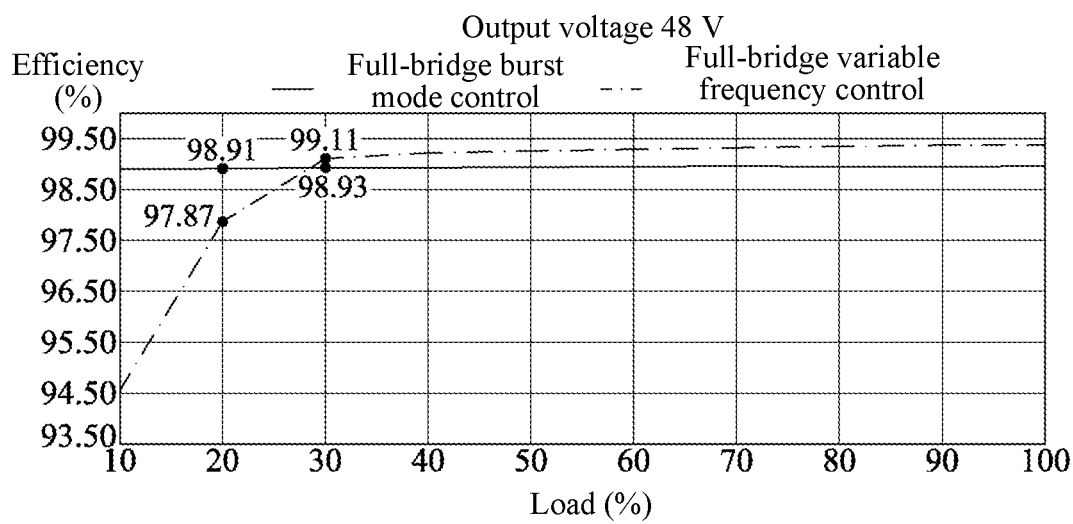
FIG. 23 is an efficiency comparison diagram of full-bridge burst mode control and full-bridge variable frequency control of the resonance conversion device.

FIG. 22 is an efficiency comparison diagram of half-bridge burst mode control and half-bridge variable frequency control of the resonance conversion device. FIG. 23 is an efficiency comparison diagram of full-bridge burst mode control and full-bridge variable frequency control of the resonance conversion device. Refer to FIG. 22 and FIG. 23 together. FIG. 22 and FIG. 23 are efficiency comparison diagrams of different control methods when the DC output voltage is 25 V and 48 V respectively, which are based on the resonance conversion device 100 recorded in FIG. 2-1 and use an example in which m=6, Q=0.53, $L_r$=420 pH, $L_m$=2.1 mH, $C_r$=6.031 nF, and the ratio of the number of turns of the primary coil $L_1$ to the secondary coil $L_2$ is $N_1:N_2=8:1$. As shown in FIG. 22, when the DC output voltage is 25 V, the efficiency of using the half-bridge burst mode control is better than that of using the half-bridge variable frequency control when the load is below 40%, and the efficiency of using the half-bridge variable frequency control is better than that of using the half-bridge burst mode control when the load is above 40%. As shown in FIG. 23, when the DC output voltage is 48 V, the efficiency of using the full-bridge burst mode control is better than that of using the full-bridge variable frequency control when the load is below 30%, and the efficiency of using the full-bridge variable frequency control is better than that of using the full-bridge burst mode control when the load is above 30%. The results shown in FIG. 22 and FIG. 23 may verify that the control method of the resonance conversion device shown in FIG. 12 has good efficiency.

Based on the above, some embodiments of the present invention can avoid efficiency reduction by a single-stage design. Some embodiments of the present invention can achieve a wide output voltage and improve the efficiency by switching the operation mode and control method of the full-bridge LLC converter circuit based on the indication voltage. Some embodiments of the present invention can further improve the efficiency by controlling using a variable frequency control method within a specific voltage and load range.

What is claimed is:

1. A resonance conversion device, comprising:
   an input filter circuit, receiving a DC input voltage and filtering the DC input voltage to output a filtered DC voltage;
   a full-bridge LLC converter circuit, receiving the filtered DC voltage and outputting a converted voltage;
   a transformer circuit, comprising a primary side and a secondary side, wherein the primary side is coupled to the full-bridge LLC converter circuit to receive the converted voltage, and the secondary side induces the converted voltage to generate an induced voltage;
   a rectifier filter circuit, coupled to the secondary side and receiving, rectifying, and filtering the induced voltage to output a DC output voltage; and
   a controller, coupled to the full-bridge LLC converter circuit and the rectifier filter circuit and configured to detect the DC output voltage and receive a voltage command from outside, wherein the controller is configured to determine whether an indication voltage of the voltage command is less than or equal to a threshold value and to perform the following steps:
   in response to the indication voltage being less than or equal to the threshold value, controlling the full-bridge LLC converter circuit into a half-bridge operation mode, and regulating the DC output voltage by performing half-bridge burst mode control on the full-bridge LLC converter circuit based on the DC output voltage; and
   in response to the indication voltage being greater than the threshold value, regulating the DC output voltage by performing full-bridge burst mode control on the full-bridge LLC converter circuit based on the DC output voltage.

2. The resonance conversion device according to claim 1, wherein the full-bridge LLC converter circuit comprises:
   a first switch, wherein a first end of the first switch is coupled to a first end of the input filter circuit;
   a second switch, wherein a first end of the second switch is coupled to the first end of the first switch;
   a third switch, wherein a first end of the third switch is coupled to a second end of the first switch, and a second end of the third switch is coupled to a second end of the input filter circuit;
   a fourth switch, wherein a first end of the fourth switch is coupled to a second end of the second switch, and a second end of the fourth switch is coupled to the second end of the third switch; and
   a series branch, comprising a resonance capacitor, a first resonance inductor, and a second resonance inductor connected in series,
   wherein a first end of the series branch is coupled between the second end of the first switch and the first end of the third switch, a second end of the series branch is coupled between the second end of the second switch and the first end of the fourth switch, and the second resonance inductor is connected in parallel to the primary side.

3. The resonance conversion device according to claim 2, wherein in response to the indication voltage being less than or equal to the threshold value, the controller controls the second switch to be turned off and the fourth switch to be turned on, so that the full-bridge LLC converter circuit enters the half-bridge operation mode.

4. The resonance conversion device according to claim 3, wherein the step of regulating, by the controller, the DC output voltage by performing the half-bridge burst mode control on the full-bridge LLC converter circuit based on the DC output voltage comprises:
   turning off the first switch and the third switch in response to the DC output voltage being greater than a first preset voltage; and
   driving the first switch with a first signal and driving the third switch with a second signal in response to the DC output voltage being less than a second preset voltage, wherein a duty cycle of the first signal and the second signal without a dead time is 50%, a frequency of the first signal and the second signal is a burst mode frequency, and the first signal and the second signal are complementary.

5. The resonance conversion device according to claim 4, wherein the burst mode frequency comprises a resonance frequency of the resonance conversion device.

6. The resonance conversion device according to claim 2, wherein the step of regulating the DC output voltage by performing the full-bridge burst mode control on the full-bridge LLC converter circuit based on the DC output voltage comprises:
   turning off the first switch, the second switch, the third switch, and the fourth switch in response to the DC output voltage being greater than a first preset voltage; and
   driving the first switch and the fourth switch with a first signal and driving the second switch and the third switch with a second signal in response to the DC output voltage being less than a second preset voltage, wherein a duty cycle of the first signal and the second signal without a dead time is 50%, a frequency of the first signal and the second signal are both is a burst mode frequency, and the first signal and the second signal are complementary.

7. The resonance conversion device according to claim 6, wherein the burst mode frequency comprises a resonance frequency of the resonance conversion device.

8. The resonance conversion device according to claim 1, wherein the threshold value is half of a designed maximum output voltage of the resonance conversion device at an operation point at a resonance frequency.

9. The resonance conversion device according to claim 1, wherein the secondary side comprises a secondary coil, the secondary coil comprises a first end and a second end, and the rectifier filter circuit is coupled to the secondary side through the first end and the second end of the secondary coil.

10. The resonance conversion device according to claim 9, wherein the rectifier filter circuit comprises a first forward conduction element, a second forward conduction element, a third forward conduction element, a fourth forward conduction element, and a capacitor, wherein a first end of the first forward conduction element is coupled to a second end of the third forward conduction element, and the first end of the secondary coil of the secondary side is coupled between the first end of the first forward conduction element and the second end of the third forward conduction element; a first end of the second forward conduction element is coupled to a second end of the fourth forward conduction element, and the second end of the secondary coil of the secondary side is coupled between the first end of the second forward conduction element and the second end of the fourth forward conduction element; a second end of the first forward conduction element, a second end of the second forward conduction element, and a first end of the capacitor are coupled to each other, and a first end of the third forward conduction element, a first end of the fourth forward conduction element, and a second end of the capacitor are coupled to each other; and a voltage across the capacitor serves as the DC output voltage.

11. The resonance conversion device according to claim 9, wherein the rectifier filter circuit comprises a fifth switch, a sixth switch, a seventh switch, an eighth switch, and a capacitor, wherein a second end of the fifth switch is coupled to a first end of the seventh switch, and the first end of the secondary coil of the secondary side is coupled between the second end of the fifth switch and the first end of the seventh switch; a second end of the sixth switch is coupled to a first end of the eighth switch, and the second end of the secondary coil of the secondary side is coupled between the second end of the sixth switch and the first end of the eighth switch; a first end of the fifth switch, a first end of the sixth switch, and a first end of the capacitor are coupled to each other, and a second end of the seventh switch, a second end of the eighth switch, and a second end of the capacitor are coupled to each other; and a voltage across the capacitor serves as the DC output voltage.

12. The resonance conversion device according to claim 1, wherein the secondary side comprises a secondary coil, the secondary coil comprises a first end, a second end, and a center tap junction, and the rectifier filter circuit is coupled to the secondary side through the first end, the second end, and the center tap junction of the secondary coil.

13. The resonance conversion device according to claim 12, wherein the rectifier filter circuit comprises a first forward conduction element, a second forward conduction element, and a capacitor, a second end of the first forward conduction element is coupled to the first end of the secondary coil, a second end of the second forward conduction element is coupled to the second end of the secondary coil, a first end of the second forward conduction element is coupled to a second end of the capacitor, a first end of the first forward conduction element is coupled between the first end of the second forward conduction element and the second end of the capacitor, a first end of the capacitor is coupled to the center tap junction, and a voltage across the capacitor serves as the DC output voltage.

14. The resonance conversion device according to claim 12, wherein the rectifier filter circuit comprises a fifth switch, a sixth switch, and a capacitor, a first end of the fifth switch is coupled to the first end of the secondary coil, a first end of the sixth switch is coupled to the second end of the secondary coil, a second end of the sixth switch is coupled to a second end of the capacitor, a second end of the fifth switch is coupled between the second end of the sixth switch and the second end of the capacitor, a first end of the capacitor is coupled to the center tap junction, and a voltage across the capacitor serves as the DC output voltage.

15. A universal serial bus circuit comprising the resonance conversion device according to claim 1, wherein the universal serial bus circuit sends the voltage command to the resonance conversion device based on a request of an external device.

16. A resonance conversion device, comprising:
   an input filter circuit, receiving a DC input voltage and filtering the DC input voltage to output a filtered DC voltage;
   a full-bridge LLC converter circuit, receiving the filtered DC voltage and outputting a converted voltage;
   a transformer circuit, comprising a primary side and a secondary side, wherein the primary side is coupled to the full-bridge LLC converter circuit to receive the converted voltage, and the secondary side induces the converted voltage to generate an induced voltage;
   a rectifier filter circuit, coupled to the secondary side and receiving, rectifying, and filtering the induced voltage to output a DC output voltage;
   a load detection circuit, detecting a load condition of the resonance conversion device; and
   a controller, coupled to the full-bridge LLC converter circuit, the load detection circuit, and the rectifier filter circuit and configured to detect the DC output voltage, receive the load condition, and receive a voltage command from outside, wherein the controller is configured to determine whether an indication voltage of the voltage command is less than or equal to a threshold value and to perform the following steps:
   in response to the indication voltage being less than or equal to the threshold value, controlling the full-bridge LLC converter circuit into a half-bridge operation mode, and regulating the DC output voltage by performing half-bridge burst-variable frequency switching mode control on the full-bridge LLC converter circuit based on the DC output voltage; and
   in response to the indication voltage being greater than the threshold value, regulating the DC output voltage by performing full-bridge burst-variable frequency switching mode control on the full-bridge LLC converter circuit based on the DC output voltage.

17. The resonance conversion device according to claim 16, wherein the step of regulating, by the controller, the DC output voltage by performing the half-bridge burst-variable frequency switching mode control on the full-bridge LLC converter circuit based on the DC output voltage comprises:
   in response to the indication voltage of the voltage command being in a first voltage interval, determining whether the load condition is light, and performing the following steps:
   (a) in response to the load condition being light, regulating the DC output voltage by performing half-bridge burst mode control on the full-bridge LLC converter circuit based on the DC output voltage; and (b) in response to the load condition not being light, regulating the DC output voltage by performing half-bridge variable frequency control on the full-bridge LLC converter circuit based on a difference between the DC output voltage and the indication voltage; and
in response to the indication voltage of the voltage command not being in the first voltage interval, regulating the DC output voltage by performing the half-bridge burst mode control on the full-bridge LLC converter circuit based on the DC output voltage.

18. The resonance conversion device according to claim 17, wherein the first voltage interval ranges from 24 to 25 V.

19. The resonance conversion device according to claim 17, wherein the full-bridge LLC converter circuit comprises:
a first switch, wherein a first end of the first switch is coupled to a first end of the input filter circuit;
a second switch, wherein a first end of the second switch is coupled to the first end of the first switch;
a third switch, wherein a first end of the third switch is coupled to a second end of the first switch, and a second end of the third switch is coupled to a second end of the input filter circuit;
a fourth switch, wherein a first end of the fourth switch is coupled to a second end of the second switch, and a second end of the fourth switch is coupled to the second end of the third switch; and
a series branch, comprising a resonance capacitor, a first resonance inductor, and a second resonance inductor connected in series,
wherein a first end of the series branch is coupled between the second end of the first switch and the first end of the third switch, a second end of the series branch is coupled between the second end of the second switch and the first end of the fourth switch, and the second resonance inductor is connected in parallel to the primary side.

20. The resonance conversion device according to claim 19, wherein in response to the indication voltage being less than or equal to the threshold value, the controller controls the second switch to be turned off and the fourth switch to be turned on, so that the full-bridge LLC converter circuit enters the half-bridge operation mode.

21. The resonance conversion device according to claim 20, wherein the step of regulating, by the controller, the DC output voltage by performing the half-bridge burst mode control on the full-bridge LLC converter circuit based on the DC output voltage comprises:
turning off the first switch and the third switch in response to the DC output voltage being greater than a first preset voltage; and
driving the first switch with a first signal and driving the third switch with a second signal in response to the DC output voltage being less than a second preset voltage, wherein a duty cycle of the first signal and the second signal without a dead time is 50%, a frequency of the first signal and the second signal is a burst mode frequency, and the first signal and the second signal are complementary.

22. The resonance conversion device according to claim 21, wherein the burst mode frequency comprises a resonance frequency of the resonance conversion device.

23. The resonance conversion device according to claim 20, wherein the step of regulating the DC output voltage by performing the half-bridge variable frequency control on the full-bridge LLC converter circuit based on the difference between the DC output voltage and the preset voltage comprises:

decreasing, by the controller, a frequency of a third signal and a frequency of a fourth signal when the difference is less than zero, and increasing the frequency of the third signal and the frequency of the fourth signal when the difference is greater than zero; and
driving the first switch with the third signal and driving the third switch with the fourth signal, wherein the third signal and the fourth signal are complementary.

24. The resonance conversion device according to claim 19, wherein the step of regulating the DC output voltage by performing the full-bridge burst mode control on the full-bridge LLC converter circuit based on the DC output voltage comprises:
turning off the first switch, the second switch, the third switch, and the fourth switch in response to the DC output voltage being greater than a first preset voltage; and
driving the first switch and the fourth switch with a first signal and driving the second switch and the third switch with a second signal in response to the DC output voltage being less than a second preset voltage, wherein a duty cycle of the first signal and the second signal without a dead time is 50%, a frequency of the first signal and the second signal is a burst mode frequency, and the first signal and the second signal are complementary.

25. The resonance conversion device according to claim 24, wherein the burst mode frequency comprises a resonance frequency of the resonance conversion device.

26. The resonance conversion device according to claim 19, wherein the step of regulating the DC output voltage by performing the full-bridge variable frequency control on the full-bridge LLC converter circuit based on the DC output voltage comprises:
decreasing, by the controller, a frequency of a third signal and a frequency of a fourth signal when the difference is less than zero, and increasing the frequency of the third signal and the frequency of the fourth signal when the difference is greater than zero; and
driving the first switch and the fourth switch with the third signal and driving the second switch and the third switch with the fourth signal, wherein the third signal and the fourth signal are complementary.

27. The resonance conversion device according to claim 1, wherein the step of regulating, by the controller, the DC output voltage by performing the full-bridge burst-variable frequency switching mode control on the full-bridge LLC converter circuit based on the DC output voltage comprises:
in response to the indication voltage of the voltage command being in a second voltage interval, determining whether the load condition is light, and performing the following steps:
(a) in response to the load condition being light, regulating the DC output voltage by performing full-bridge burst mode control on the full-bridge LLC converter circuit based on the DC output voltage; and
(b) in response to the load condition not being light, regulating the DC output voltage by performing full-bridge variable frequency control on the full-bridge LLC converter circuit based on a difference between the DC output voltage and the indication voltage; and
in response to the indication voltage of the voltage command not being in the second voltage interval, regulating the DC output voltage by performing the full-bridge burst mode control on the full-bridge LLC converter circuit based on the DC output voltage.

28. The resonance conversion device according to claim 27, wherein the second voltage interval ranges from 48 to 50 V.

29. The resonance conversion device according to claim 27, wherein the full-bridge LLC converter circuit comprises:
a first switch, wherein a first end of the first switch is coupled to a first end of the input filter circuit;
a second switch, wherein a first end of the second switch is coupled to the first end of the first switch;
a third switch, wherein a first end of the third switch is coupled to a second end of the first switch, and a second end of the third switch is coupled to a second end of the input filter circuit;
a fourth switch, wherein a first end of the fourth switch is coupled to a second end of the second switch, and a second end of the fourth switch is coupled to the second end of the third switch; and
a series branch, comprising a resonance capacitor, a first resonance inductor, and a second resonance inductor connected in series,
wherein a first end of the series branch is coupled between the second end of the first switch and the first end of the third switch, a second end of the series branch is coupled between the second end of the second switch and the first end of the fourth switch, and the second resonance inductor is connected in parallel to the primary side.

30. The resonance conversion device according to claim 29, wherein in response to the indication voltage being less than or equal to the threshold value, the controller controls the second switch to be turned off and the fourth switch to be turned on, so that the full-bridge LLC converter circuit enters the half-bridge operation mode.

31. The resonance conversion device according to claim 30, wherein the step of regulating, by the controller, the DC output voltage by performing the half-bridge burst mode control on the full-bridge LLC converter circuit based on the DC output voltage comprises:
turning off the first switch and the third switch in response to the DC output voltage being greater than a first preset voltage; and
driving the first switch with a first signal and driving the third switch with a second signal in response to the DC output voltage being less than a second preset voltage, wherein a duty cycle of the first signal and the second signal without a dead time is 50%, a frequency of the first signal and the second signal is a burst mode frequency, and the first signal and the second signal are complementary.

32. The resonance conversion device according to claim 31, wherein the burst mode frequency comprises a resonance frequency of the resonance conversion device.

33. The resonance conversion device according to claim 30, wherein the step of regulating the DC output voltage by performing the half-bridge variable frequency control on the full-bridge LLC converter circuit based on the difference between the DC output voltage and the preset voltage comprises:
decreasing, by the controller, a frequency of a third signal and a frequency of a fourth signal when the difference is less than zero, and increasing the frequency of the third signal and the frequency of the fourth signal when the difference is greater than zero; and
driving the first switch with the third signal and driving the third switch with the fourth signal, wherein the third signal and the fourth signal are complementary.

34. The resonance conversion device according to claim 29, wherein the step of regulating the DC output voltage by performing the full-bridge burst mode control on the full-bridge LLC converter circuit based on the DC output voltage comprises:
turning off the first switch, the second switch, the third switch, and the fourth switch in response to the DC output voltage being greater than a first preset voltage; and
driving the first switch and the fourth switch with a first signal and driving the second switch and the third switch with a second signal in response to the DC output voltage being less than a second preset voltage, wherein a duty cycle of the first signal and the second signal without a dead time is 50%, a frequency of the first signal and the second signal is a burst mode frequency, and the first signal and the second signal are complementary.

35. The resonance conversion device according to claim 34, wherein the burst mode frequency comprises a resonance frequency of the resonance conversion device.

36. The resonance conversion device according to claim 29, wherein the step of regulating the DC output voltage by performing the full-bridge variable frequency control on the full-bridge LLC converter circuit based on the DC output voltage comprises:
decreasing, by the controller, a frequency of a third signal and a frequency of a fourth signal when the difference is less than zero, and increasing the frequency of the third signal and the frequency of the fourth signal when the difference is greater than zero; and
driving the first switch and the fourth switch with the third signal and driving the second switch and the third switch with the fourth signal, wherein the third signal and the fourth signal are complementary.

37. The resonance conversion device according to claim 16, wherein the threshold value is half of a designed maximum output voltage of the resonance conversion device at an operation point at a resonance frequency.

38. The resonance conversion device according to claim 16, wherein the secondary side comprises a secondary coil, the secondary coil comprises a first end and a second end, and the rectifier filter circuit is coupled to the secondary side through the first end and the second end of the secondary coil.

39. The resonance conversion device according to claim 38, wherein the rectifier filter circuit comprises a first forward conduction element, a second forward conduction element, a third forward conduction element, a fourth forward conduction element, and a capacitor, wherein a first end of the first forward conduction element is coupled to a second end of the third forward conduction element, and the first end of the secondary coil of the secondary side is coupled between the first end of the first forward conduction element and the second end of the third forward conduction element; a first end of the second forward conduction element is coupled to a second end of the fourth forward conduction element, and the second end of the secondary coil of the secondary side is coupled between the first end of the second forward conduction element and the second end of the fourth forward conduction element; a second end of the first forward conduction element, a second end of the second forward conduction element, and a first end of the capacitor are coupled to each other, and a first end of the third forward conduction element, a first end of the fourth forward conduction element, and a second end of the capacitor are coupled to each other; and a voltage across the capacitor serves as the DC output voltage.

40. The resonance conversion device according to claim 38, wherein the rectifier filter circuit comprises a fifth switch, a sixth switch, a seventh switch, an eighth switch, and a capacitor, wherein a second end of the fifth switch is coupled to a first end of the seventh switch, and the first end of the secondary coil of the secondary side is coupled between the second end of the fifth switch and the first end of the seventh switch; a second end of the sixth switch is coupled to a first end of the eighth switch, and the second end of the secondary coil of the secondary side is coupled between the second end of the sixth switch and the first end of the eighth switch; a first end of the fifth switch, a first end of the sixth switch, and a first end of the capacitor are coupled to each other, and a second end of the seventh switch, a second end of the eighth switch, and a second end of the capacitor are coupled to each other; and a voltage across the capacitor serves as the DC output voltage.

41. The resonance conversion device according to claim 16, wherein the secondary side comprises a secondary coil, the secondary coil comprises a first end, a second end, and a center tap junction, and the rectifier filter circuit is coupled to the secondary side through the first end, the second end, and the center tap junction of the secondary coil.

42. The resonance conversion device according to claim 41, wherein the rectifier filter circuit comprises a first forward conduction element, a second forward conduction element, and a capacitor, a second end of the first forward conduction element is coupled to the first end of the secondary coil, a second end of the second forward conduction element is coupled to the second end of the secondary coil, a first end of the second forward conduction element is coupled to a second end of the capacitor, a first end of the first forward conduction element is coupled between the first end of the second forward conduction element and the second end of the capacitor, a first end of the capacitor is coupled to the center tap junction, and a voltage across the capacitor serves as the DC output voltage.

43. The resonance conversion device according to claim 41, wherein the rectifier filter circuit comprises a fifth switch, a sixth switch, and a capacitor, a first end of the fifth switch is coupled to the first end of the secondary coil, a first end of the sixth switch is coupled to the second end of the secondary coil, a second end of the sixth switch is coupled to a second end of the capacitor, a second end of the fifth switch is coupled between the second end of the sixth switch and the second end of the capacitor, a first end of the capacitor is coupled to the center tap junction, and a voltage across the capacitor serves as the DC output voltage.

44. A universal serial bus circuit comprising the resonance conversion device according to claim 16, wherein the universal serial bus circuit sends the voltage command to the resonance conversion device based on a request of an external device.

* * * * *